US012269432B1

(12) United States Patent
Sutliff

(10) Patent No.: US 12,269,432 B1
(45) Date of Patent: Apr. 8, 2025

(54) BICYCLE RACK THAT IS REVERSIBLY ATTACHABLE TO A PICKUP TRUCK BED WITH A BED SHELL OR BED CAP

(71) Applicant: Russell Sutliff, Granite Bay, CA (US)

(72) Inventor: Russell Sutliff, Granite Bay, CA (US)

( * ) Notice: Subject to any disclaimer, the term of this patent is extended or adjusted under 35 U.S.C. 154(b) by 0 days.

(21) Appl. No.: 18/928,045

(22) Filed: Oct. 27, 2024

(51) Int. Cl.
*B60R 9/10* (2006.01)
*B60R 9/02* (2006.01)
*B62H 3/02* (2006.01)
*B62H 3/08* (2006.01)

(52) U.S. Cl.
CPC ............ *B60R 9/10* (2013.01); *B60R 9/02* (2013.01); *B62H 3/02* (2013.01); *B62H 3/08* (2013.01)

(58) Field of Classification Search
CPC ....................................................... B60R 9/10
USPC ............................................................ 224/924
See application file for complete search history.

(56) References Cited

U.S. PATENT DOCUMENTS

| | | | | |
|---|---|---|---|---|
| 5,261,719 A | * | 11/1993 | Tucker ............... | B60J 7/104 |
| | | | | 296/100.18 |
| 5,303,858 A | * | 4/1994 | Price .................. | B60P 3/1008 |
| | | | | 224/570 |
| 6,340,106 B1 | * | 1/2002 | Dutton ................ | B60R 9/00 |
| | | | | 224/403 |
| 10,040,490 B2 | * | 8/2018 | Schlaupitz ........... | B60R 9/00 |
| 10,427,614 B2 | * | 10/2019 | Marchlewski ....... | B60R 9/00 |
| 11,072,294 B2 | * | 7/2021 | Fehr .................... | B60R 9/10 |
| 2018/0361944 A1 | * | 12/2018 | Marchlewski ...... | B62D 33/0207 |
| 2024/0190356 A1 | * | 6/2024 | Wilson ................ | B60R 9/10 |
| 2024/0326930 A1 | * | 10/2024 | Sevian ................. | B62D 33/04 |

OTHER PUBLICATIONS

Tacomaworld.com, "KB Voodoo Outboard Bike Mount—Ready to Ship". (Year: 2015).*

* cited by examiner

Primary Examiner — Scott T McNurlen
(74) Attorney, Agent, or Firm — Craig A. Simmermon

(57) ABSTRACT

A bicycle rack for a pickup truck that is reversibly attachable to the bed of a pickup truck that also has a bed shell or bed cap installed thereon. The bicycle rack of this invention sets off to the side of the truck bed like a saddle bag in order to provide clearance for the bed shell or bed cap. The bicycle rack includes a special base plate assembly that is a custom shaped rigid plate assembly. Base plate assembly has a complex shape that was designed to yield high strength and rigidity in order to provide solid and stable attachment of a bicycle to the bicycle rack and the bicycle rack to the pickup truck. The bicycle rack can be installed on the right side, the left side, or both sides of a pickup truck.

7 Claims, 17 Drawing Sheets

US 12,269,432 B1

BICYCLE RACK THAT IS REVERSIBLY ATTACHABLE TO A PICKUP TRUCK BED WITH A BED SHELL OR BED CAP

BACKGROUND OF THE INVENTION

1. Field of the Invention

This invention relates to a bicycle rack for a pickup truck and specifically to a bicycle rack that is reversibly attachable to the bed of a pickup truck that also has a bed shell or bed cap installed thereon. The bicycle rack of this invention sets off to the side of the truck bed like a saddle bag in order to provide clearance for the bed shell or bed cap. The bicycle rack of this invention can be installed on the right side, the left side, or both sides of a pickup truck. A bed shell or bed cap is defined as follows.

A bed shell, also known as, a cap, canopy, topper, pap cap, truck cap, bed cap, box cap, or camper shell is a small housing or rigid canopy used as a pickup truck accessory. The housing is usually made of fiberglass or aluminum, but sometimes wood or canvas, and is mounted on top of the pickup truck's rear bed. The shell usually covers the entire bed of the pickup truck, and is large enough to be used for camping purposes. The top of the shell is usually even with or above the top of the pickup truck cab. Even though use for camping may have been its initial purpose, shells are now most often used for utility, storage purposes, and to protect bed cargo from the elements and theft.

2. Description of Related Art

There are other bicycle racks in the prior art that attach to a pickup truck with a bed shell or bed cap installed. However, there are none with a base plate assembly as shown and described here that can be clamped between the truck bed and the bed shell or bed cap in order to yield exceptionally strong and stable mounting of the bicycle rack. The special shape and design of the base plate assembly is exceptionally strong and rigid which allows the bicycle rack(s) and bicycle(s) to remain steady and free from vibrations at all times and during travel.

BRIEF SUMMARY OF THE INVENTION

It is an aspect of bicycle rack that is reversibly attachable to a pickup truck bed with a bed shell or bed cap to be reversibly attachable to the bed of a pickup truck.

It is an aspect of bicycle rack that is reversibly attachable to a pickup truck bed with a bed shell or bed cap to be reversibly attachable to the bed of a pickup truck with a bed shell or bed cap installed onto the bed of the pickup truck.

It is an aspect of bicycle rack that is reversibly attachable to a pickup truck bed with a bed shell or bed cap to include a special base plate assembly that can be clamped or sandwiched between the bed the bed shell or bed cap and the bed of the pickup truck to yield a sturdy mount for the bicycle rack.

It is an aspect of special base plate assembly to include a top plate, a side plate, a bottom plate, and a side plate.

It is an aspect of special base plate assembly to include at least three mounting tabs or holes that align with mounting holes on the bed shell or bed cap.

It is an aspect of special base plate assembly to include one mounting tab or hole that that aligns with the inside corner of the bed on the pickup truck.

It is an aspect of certain embodiments of bicycle rack that is reversibly attachable to a pickup truck bed with a bed shell or bed cap to include a tire cradle that receives and holds the two tires and wheels of a bicycle.

It is an aspect of certain embodiments of bicycle rack that is reversibly attachable to a pickup truck bed with a bed shell or bed cap to include a harp member or a bow that functions as an attachment point for the seat, seat pole, or any other part of the bicycle.

It is an aspect of certain embodiments of bicycle rack that is reversibly attachable to a pickup truck bed with a bed shell or bed cap for the harp member or bow to be retractable.

It is an aspect of certain embodiments of bicycle rack that is reversibly attachable to a pickup truck bed with a bed shell or bed cap to include a ratcheting hook member to attach to and retain the bicycle.

It is an aspect of certain embodiments of bicycle rack that is reversibly attachable to a pickup truck bed with a bed shell or bed cap to include an axle latch to attach and retain the bicycle.

It is an aspect of certain embodiments of bicycle rack that is reversibly attachable to a pickup truck bed with a bed shell or bed cap to include a front and rear stanchion assembly, each with a ratcheting tire clamp to attach and retain the bicycle.

DEFINITION LIST

Figure 1:
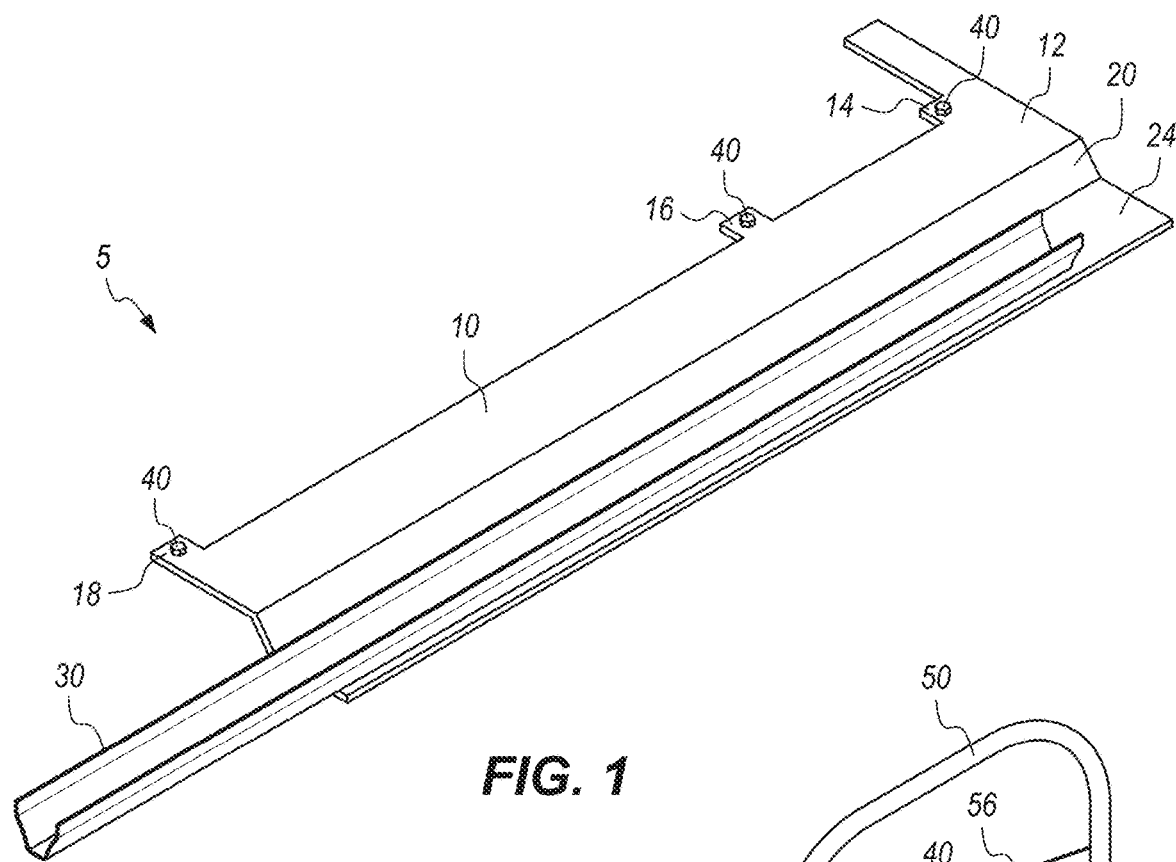
FIG. 1 is a perspective view of a first embodiment of bicycle rack that is reversibly attachable to a pickup truck bed with a bed shell or bed cap.
Figure 2:
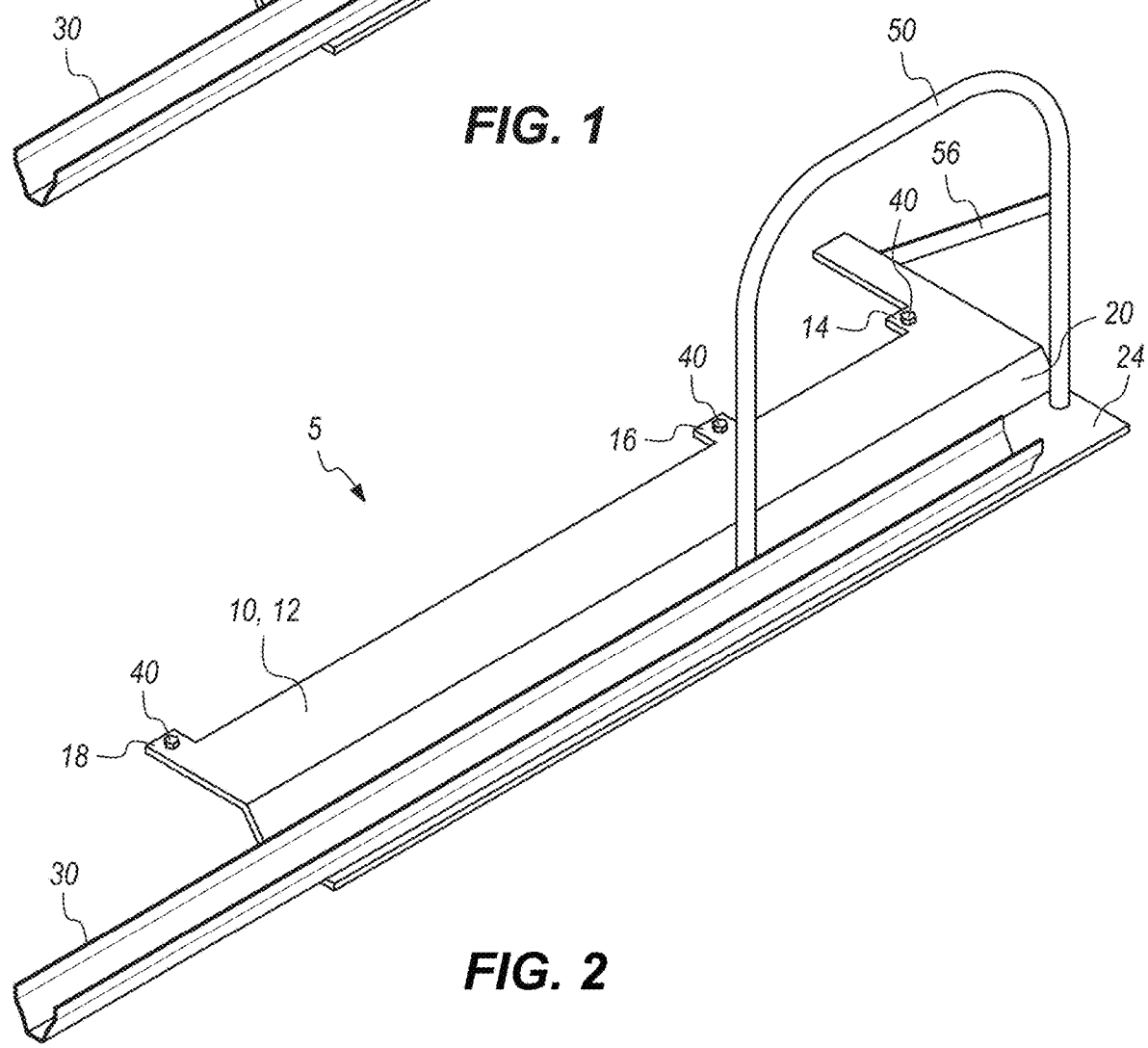
FIG. 2 is a perspective view of a second embedment of bicycle rack that is reversibly attachable to a pickup truck bed with a bed shell or bed cap with a harp member.

| Term | Definition |
| --- | --- |
| 5 | Bicycle Rack that is Reversibly Attachable to a Pickup Truck Bed with a Bed Shell or Bed Cap |
| 10 | Base Plate Assembly |
| 12 | Top Plate |
| 14 | Top Plate Forward Tab |
| 16 | Top Plate Center Tab |
| 18 | Top Plate Rearward Tab |
| 20 | Side Plate |
| 22 | Front Plate |
| 24 | Bottom Plate |
| 26 | Bottom Plate Forward Mounting Hole |
| 28 | Bottom Plate Rearward Mounting Hole |
| 30 | Tire Cradle |
| 32 | Tire Strap |
| 34 | Second Tire Cradle |
| 38 | Second Tire Cradle Attachment Bracket |
| 40 | Clamp Bolt |
| 42 | Clamp Nut |
| 50 | Harp Member |
| 51 | First Harp Hinge |
| 52 | Second Harp Hinge |
| 53 | First Harp Sleeve |
| 54 | Second Harp Sleeve |
| 56 | Harp Gusset |
| 58 | Harp Clamp or Strap |
| 60 | Ratcheting Hook Member |
| 62 | Hook Member Mounting Bar |
| 70 | Axle Latch |
| 80 | Inner Base Rail |

DEFINITION LIST -continued

| Term | Definition |
| --- | --- |
| 82 | Outer Base Rail |
| 84 | Front Stanchion Assembly |
| 86 | Front Ratcheting Tire Clamp |
| 88 | Rear Stanchion Assembly |
| 90 | Rear Ratcheting Tire Clamp |
| 100 | Pickup Truck |
| 102 | Pickup Truck Bed |
| 106 | Bed Shell or Bed Cap |
| 120 | Bicycle |
| 122 | Bicycle Tire |

DETAILED DESCRIPTION OF THE INVENTION

Bicycle rack that is reversibly attachable to a pickup truck bed with a bed shell or bed cap 5 is a bicycle rack that is rigidly attached to a pickup truck bed 102 that also has a bed shell or bed cap 106 installed thereon. Bicycle rack that is reversibly attachable to a pickup truck bed with a bed shell or bed cap 5 has a special base plate assembly 10 that is clamped between the pickup truck bed 102 and the bed shell or bed cap 106 in order to yield a very strong and rigid attachment of the bicycle rack 5 to the pickup truck 100.

In a first embodiment, bicycle rack that is reversibly attachable to a pickup truck bed with a bed shell or bed cap 5 comprises: a base plate assembly 10 and a tire cradle 30.

Base plate assembly 10 is a custom shaped rigid plate assembly that essentially looks like a three-dimensional L-shape. Base plate assembly 10 has a complex shape that was designed to yield high strength and rigidity in order to provide solid and stable attachment of a bicycle 120 to the bicycle rack 5 and the bicycle rack 5 to the pickup truck 100.

Base plate assembly 10 comprises: a top plate 12; a side plate 20; a front plate 22; and a bottom plate 24. Top plate 12, side plate 20, front plate 22, and a bottom plate 24 are connected together or formed together to yield the base plate assembly 10. As discussed below, base plate assembly 10 may comprise individual sheets of material that are attached together or may be stamped or forged from one sheet of material. Any known method of fabrication may be used to construct the specific rigid shape of base plate assembly 10 which is defined as follows.

Please note that throughout this writing, front or frontwards references the end or direction that is adjacent to the front of the pickup truck 100 that the bicycle rack 5 is attached to. Likewise, rear or rearwards references the end or direction that is adjacent to the rear of the pickup truck 100. Inner or inside references the end or direction that is adjacent to the pickup truck 100. Outer or outside references the end or direction that is not adjacent to or opposite to the pickup truck 100.

Top plate 12 is the largest plate in the base plate assembly 10. Top plate 12 is essentially an L-shaped horizontal member as viewed from the top with the lower portion of the L-shape facing frontwards and the upper portion of the L-shape facing rearwards, as depicted. Top plate 12 is a rigid planar L-shaped horizontal member or sheet of material with a plane, a front edge, a first rear edge, a second rear edge, an outer edge, a first inner edge, a second inner edge, an upper surface, a lower surface, a thickness, a longitudinal axis, and a latitudinal axis. The first inner edge is the inner edge of the upper portion of the L-shape. The second inner edge is the inner edge of the lower portion of the L-shape. The first rear edge is the rear edge of the lower portion of the L-shape. The second rear edge is the rear edge of the upper portion of the L-shape. Top plate 12 has a length of about 2-10 feet. Top plate 12 has an overall width that corresponds to the perpendicular distance between the first inner edge and the outer edge that is about 5-50 inches. Top plate 12 has a minor width that corresponds to the perpendicular distance between the second inner edge and the outer edge that is about 3-20 inches. As detailed below, the top plate 12 is clamped or sandwiched between the bed shell or bed cap 106 and the pickup truck bed 102 in order to install the bicycle rack 5 on a pickup truck 100.

Side plate 20 is a rigid planar member or sheet of material with a plane, a front edge, a rear edge, an inner edge, an outer edge, an upper surface, a lower surface, a length, a width, a thickness, a longitudinal axis, and a latitudinal axis. Side plate 20 is rigidly attached to the top plate 12, the front plate 22, and the bottom plate 24. Side plate 20 is a diagonal member that lies on a diagonal plane. The length of side plate 20 is equal to that of top plate 12. The width of side plate 20 is about 2-20 inches.

Front plate 22 is a rigid planar vertical member or sheet of material with a plane, an upper edge, a lower edge, an inner edge, an outer edge, a front surface, a rear surface, a length, a width, a thickness, a longitudinal axis, and a latitudinal axis. Front plate 22 is rigidly attached to the top plate 12 and the side plate 20. Front plate 22 is a vertical member.

Bottom plate 24 is a rigid planar horizontal member or sheet of material with a plane, a front edge, a rear edge, an inner edge, an outer edge, an upper surface, a lower surface, a length, a width, a length, a thickness, a longitudinal axis, and a latitudinal axis. Bottom plate 24 is rigidly attached to the front plate 22. Bottom plate 24 is a horizontal member. The width of bottom plate 24 is equal to the width of tire cradle 30 or slightly greater than the width of tire cradle 30. The length of bottom plate 24 is equal to that of top plate 12. The width of bottom plate 24 is about 3-20 inches.

Top plate 12, side plate 20, front plate 22; and bottom plate 24 are connected together in the following way to form the base plate assembly 10. The longitudinal axes of the top plate 12, side plate 20, and bottom plate 24 are parallel. The longitudinal axis of front plate 22 is perpendicular to those of the top plate 12, side plate 20, and bottom plate 24. The plane of top plate 12 is parallel with the plane of bottom plate 24. The plane of front plate 22 is perpendicular to the plane of top plate 12. The outer edge of top plate 12 is joined with or rigidly attached to the inner edge of side plate 20. The plane of top plate 12 meets the plane of side plate 20 at an angle that is greater than 180 degrees and less than 270 degrees. The lower surface of top plate 12 and the lower surface of side plate 20 are at an angle less than 180 degrees. The upper surface of top plate 12 and the upper surface of side plate 20 are at an angle greater than 180 degrees. The front edge of top plate 12 is joined with or rigidly attached to the upper edge of front plate 22. The outer edge of side plate 20 is joined with or rigidly attached to the inner edge of bottom plate 24. The front edge of side plate 20 is joined with or rigidly attached to the outer edge of front plate 22. The front edge of top plate 12 is aligned with and even with the front edge of side plate 22, the front edge of side plate 20, and the front surface of front plate 22, as depicted. The rear edge of top plate 12 is aligned with and even with the rear edge of side plate 22 and the rear edge of side plate 20, as depicted. The top plate 12 meets the front plate 22 at a right angle which yields a super rigid structure for the entire base plate assembly 10. This super rigid structure keeps the bicycle rack 5 and bicycle 110 steady and free from vibrations during travel.

The rigid attachment of plates 12,20,22,24 may be accomplished by any known means such as: brake bending, die press bending, pressed seam, weld, solder, glue, epoxy, adhesive, bolts, screws, rivets, clips, snaps, pins, or fasteners. Base plate assembly 10 may be: a one-piece integral structure that was stamped or forged from one piece of material, a multi-piece structure that was attached together to form the shape, or any combination thereof. Base plate assembly 10 may be made of any known material such as: metal, steel, aluminum, polymer, plastic, composite, wood, fiberglass, ceramic, carbon fiber, or combination thereof, or any other known material. In best mode, base plate assembly is a one-piece integral structure. Base plate assembly 10 is the primary source of the substantial rigidity and sturdiness of the bicycle rack 5.

Top plate 12 further comprises: a top plate forward tab 14, a top plate center tab 16, and a top plate rearward tab 18. Top plate forward tab 14 is a rectangular or square extension or ear projecting out from the corner of top plate 12 between the inner edge and the first rear edge of top plate 12. Top plate forward tab 14 has a rear edge, an inner edge, an upper surface, a lower surface, a length, a width, and a thickness. Top plate forward tab 14 has a hole through its center which receives a clamp bolt 40 as discussed below. Top plate forward tab 14 is co-planar with top plate 12. In best mode, top plate forward tab 14 is integral with top plate 12 and made from the same piece of material.

Top plate center tab 16 is a rectangular or square extension or ear projecting out from the inner edge of top plate 12 at a location in between the forward edge of top plate 12 and the rear edge of top plate 12.

Top plate center tab 16 has a front edge, a rear edge, an inner edge, an upper surface, a lower surface, a length, a width, and a thickness. Top plate center tab 16 has a hole through its center which receives a clamp bolt 40 as discussed below. Top plate center tab 16 is located near or adjacent to the spot where the front bicycle tire rests on the tire cradle 30 when a bicycle 120 is properly mounted on bicycle rack 5. Top plate center tab 16 is co-planar with top plate 12. In best mode, top plate center tab 16 is integral with top plate 12 and made from the same piece of material.

Top plate rearward tab 18 is a rectangular or square extension or ear projecting out from the inner edge of top plate 12, at the rear inner corner of top plate 12, at a point that is adjacent to and contiguous with the second rear edge of top plate 12. Top plate rearward tab 18 has a front edge, a rear edge, an inner edge, an upper surface, a lower surface, a length, a width, and a thickness. Top plate rearward tab 18 has a hole through its center which receives a clamp bolt 40 as discussed below. Top plate rearward tab 18 is located near or adjacent to the spot where the rear bicycle tire rests on the tire cradle 30 when a bicycle 120 is properly mounted on bicycle rack 5. Top plate rearward tab 18 is co-planar with top plate 12. In best mode, top plate rearward tab 18 is integral with top plate 12 and made form the same piece of material.

Bottom plate 24 further comprises: a bottom plate forward mounting hole 26 and a bottom plate rearward mounting hole 28. Bottom plate forward mounting hole 26 is a is a circular hole or slotted hole through the bottom plate 24 at a location towards front edge of bottom plate 24. Bottom plate forward mounting hole 26 has a longitudinal axis that is perpendicular to that of bottom plate 24. Bottom plate forward mounting hole 26 functions as a mounting hole for tire cradle 30. Bottom plate rearward mounting hole 28 is a is a circular hole or slotted hole through the bottom plate 24 at a location towards rear edge of bottom plate 24. Bottom plate rear mounting hole 28 has a longitudinal axis that is perpendicular to that of bottom plate 24. Bottom plate rear mounting hole 28 functions as a mounting hole for tire cradle 30.

Tire cradle 30 is a rigid concave upward shaped elongated horizontal member, as depicted. Tire cradle 30 is a trough, linear channel, or saddle shaped member that is long enough to receive and hold both tires of a typically sized or large sized bicycle. Tire cradle 30 has an upper surface, a lower surface, front end, and a rear end, a length, width, height, thickness, and longitudinal axis. Tire cradle 30 has a bottom member and at least two side members that run the full length of tire cradle 30 thereby making the trough, elongated channel, or saddle shaped member that is long enough to receive and hold both tires of a typically sized or large sized bicycle. Tire cradle 30 may be made of any known material. Tire cradle 30 functions to receive and hold the two tires/wheels of a bicycle 120. Tire cradle 30 is rigidly attached to bottom plate 24 so that the longitudinal axis of tire cradle is parallel with that of side plate 20 and bottom plate 24. The lower surface of tire cradle 30 is rigidly attached to the upper surface of bottom plate 24 at the bottom plate forward mounting hole 26 and the bottom plate rearward mounting hole 28. Rigid attachment may be accomplished by any known means such as: weld, solder, glue, epoxy, adhesive, bolts, screws, rivets, clips, snaps, pins, or fasteners. In best mold, two fasteners are used, one fastener with bottom plate forward mounting hole 26 and another fastener with bottom plate rearward mounting hole 28.

The above describes the first embodiment or base mode of bicycle rack that is reversibly attachable to a pickup truck bed with a bed shell or bed cap 5. The first embodiment is depicted in FIG. 1 and claimed in claim 1.

Figure 7:
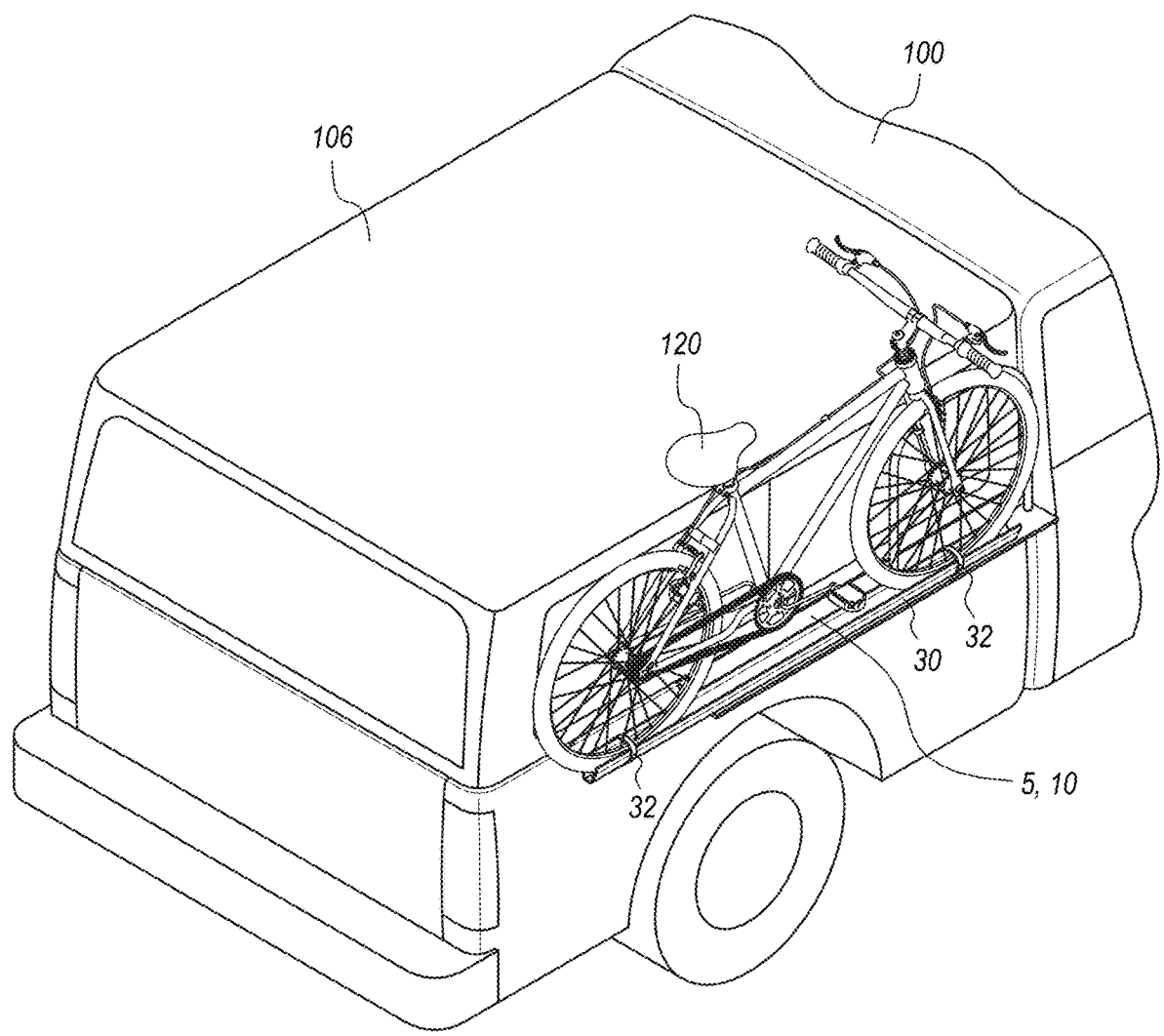
FIG. 7 is a perspective view of the second embodiment of bicycle rack that is reversibly attachable to a pickup truck bed with a bed shell or bed cap mounted on a pickup truck with a bed shell or bed cap, with a bicycle attached to the bicycle rack.

Bicycle rack that is reversibly attachable to a pickup truck bed with a bed shell or bed cap 5 is reversibly attached to the bed 102 of a pickup truck 100 with a bed shell or bed cap 106 installed, as follows. FIG. 7 depicts bicycle rack that is reversibly attachable to a pickup truck bed with a bed shell or bed cap 5 reversibly attached to the bed 102 of a pickup truck 100 with a bed shell or bed cap 106 installed. The bed shell or bed cap 106 is removed from the pickup truck 100. The pickup truck bed 102 and bed sides are cleaned. Then the top plate 12 is positioned on one side of the pickup truck bed 102 so that the top plate forward tab 14 is exactly located at the inside corner of a front corner of the pickup truck bed 102. Note that bicycle rack that is reversibly attachable to a pickup truck bed with a bed shell or bed cap 5 comes in a right side configuration, which is depicted in FIG. 1, and also comes in a left side configuration, which would be the exact inverse of FIG. 1.

With a right side configuration, the hole in top plate forward tab is located exactly at the inside corner of the right front corner of the pickup truck bed 102. The hole in top plate center tab 16 is aligned with a mounting hole on the bed shell or bed cap 106. The hole in top plate rearward tab 18 is aligned with another mounting hole on the bed shell or bed cap 106.

With a left side configuration, the hole in top plate forward tab is located exactly at the inside corner of the left front corner of the pickup truck bed 102. The hole in top plate center tab 16 is aligned with a mounting hole on the bed shell or bed cap 106. The hole in top plate rearward tab 18 is aligned with another mounting hole on the bed shell or bed cap 106.

Note that bed shells or bed caps 106 have a plurality of mounting holes along the lower rim of the bed shell or bed cap 106. Bed shells or bed caps also include a plurality of clamp bolts 40 and clamp nuts 42, wherein each mounting hole on the bed shell or bed cap 106 receives one clamp bolt 40 and one clamp nut 42 that are used to mount the bed shell or bed cap 106 on the pickup truck bed 102. Applicant has taken advantage of these clamp bolts 40 and clamp nuts 42 and has incorporated them into the attachment of the bicycle rack that is reversibly attachable to a pickup truck bed with a bed shell or bed cap 5 to the pickup truck bed 102.

Figure 3:
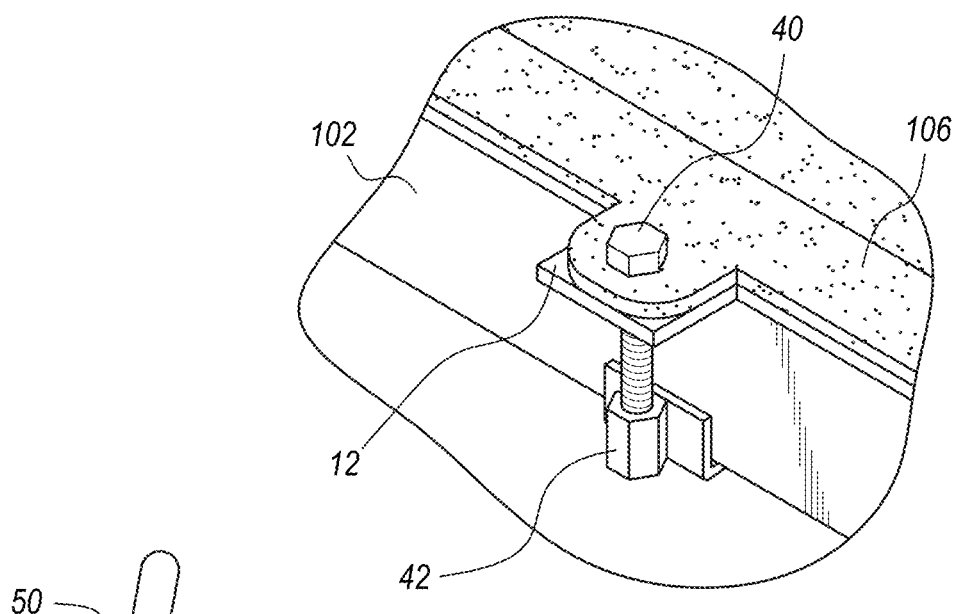
FIG. 3 is an enlarged view of the clamping arrangement between: the clamp bolt, clamp nut, pickup truck bed, top plate, and bed shell or bed cap.
Figure 4:
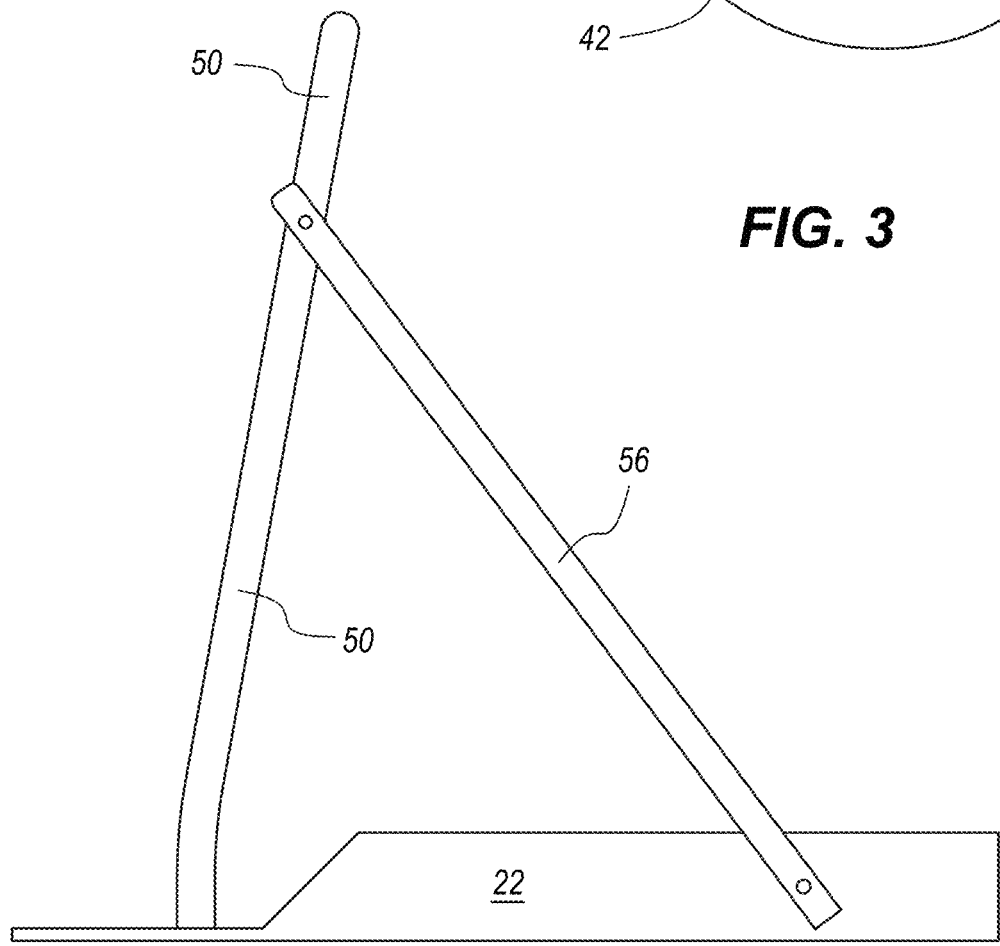
FIG. 4 is a front elevational view of the base plate assembly with attached harp member and harp gusset.

Continuing on with the installation of a right side configuration, the top plate forward tab 14 is positioned at the front right corner of the pickup truck bed 102. Then the bed shell of bed cap 106 is positioned on top of the top plate 12 and the pickup truck bed 102. Then the hole on top plate center tab 16 is aligned with a mounting hole on the bed shell or bed cap 106 and the hole on the top plate rearward tab 18 is aligned with another mounting hole on the bed shell or bed cap 106. Note that the hole pattern or location of the holes on tabs 16,18 is designed to match up with and align with two specific holes on the bed shells or bed caps 106. Thus, certain models of base plate assembly 10 would match certain models of bed shell or bed cap 106, wherein different models or sizes of base plate assembly would be required to fit different models of bed shell or bed cap 106. As stated, the hole on the top plate forward tab does not align with a mounting hole on the bed shell or bed cap 106. Then a clamp bolt 40 is inserted through the hole on top plate forward tab 14 from the upper surface. Next, a clamp bolt 40 is inserted through the upper side of all mounting holes on the bed shell or bed cap 106, which includes the hole on the top plate center tab 16 and the hole on the top plate rearward tab 18. Then a clamp nut 42 is installed onto each clamp bolt 40 from the bottom. Each clamp nut 42 must grab onto a rib or support member on the underside of the pickup truck bed 102. The clamp nuts 42 design for this purpose and are shaped to catch onto existing structure on the pickup truck bed 102. Then all clamp bolts 40 are tightened to specification. FIG. 3 depicts this clamp arrangement. Note that the top plate forward tab requires one additional clamp bolt 40 and clamp nut 42 in addition to those provided with the bed shell or bed cap 106, wherein this clamp bolt 40 and clamp nut 42 clamp onto the top plate 12 without the bed shell or bed cap 106 in between. This "corner clamp" provides substantial rigidity and strength to the bicycle rack 5.

The clamp bolt and clamp process for a left hand configuration is exactly like the above while substituting the word left for right.

Figure 5:
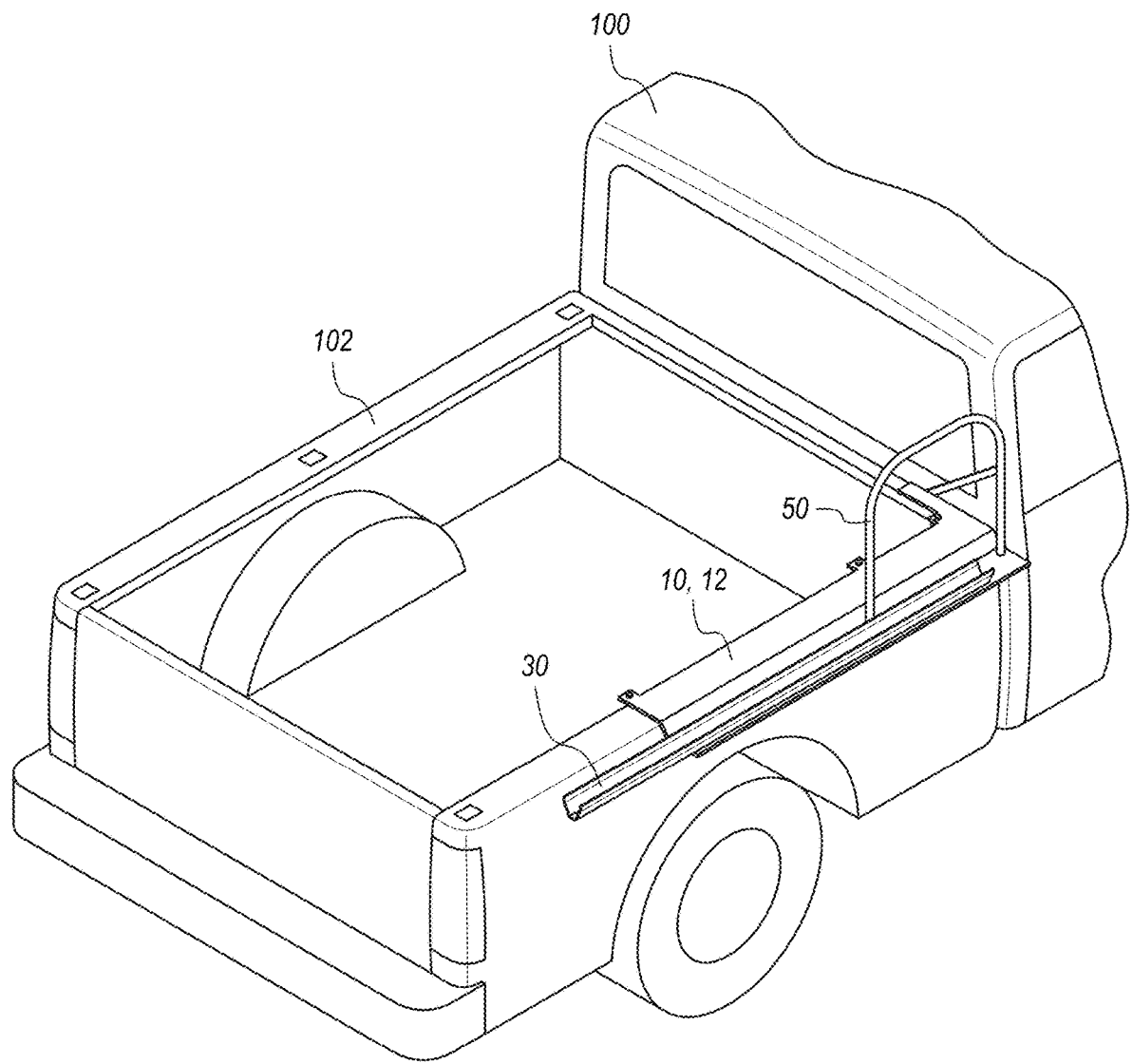
FIG. 5 is a perspective view of the second embodiment of bicycle rack that is reversibly attachable to a pickup truck bed with a bed shell or bed cap mounted on a pickup truck without with a bed shell or bed cap, without a bicycle attached to the bicycle rack.
Figure 6:
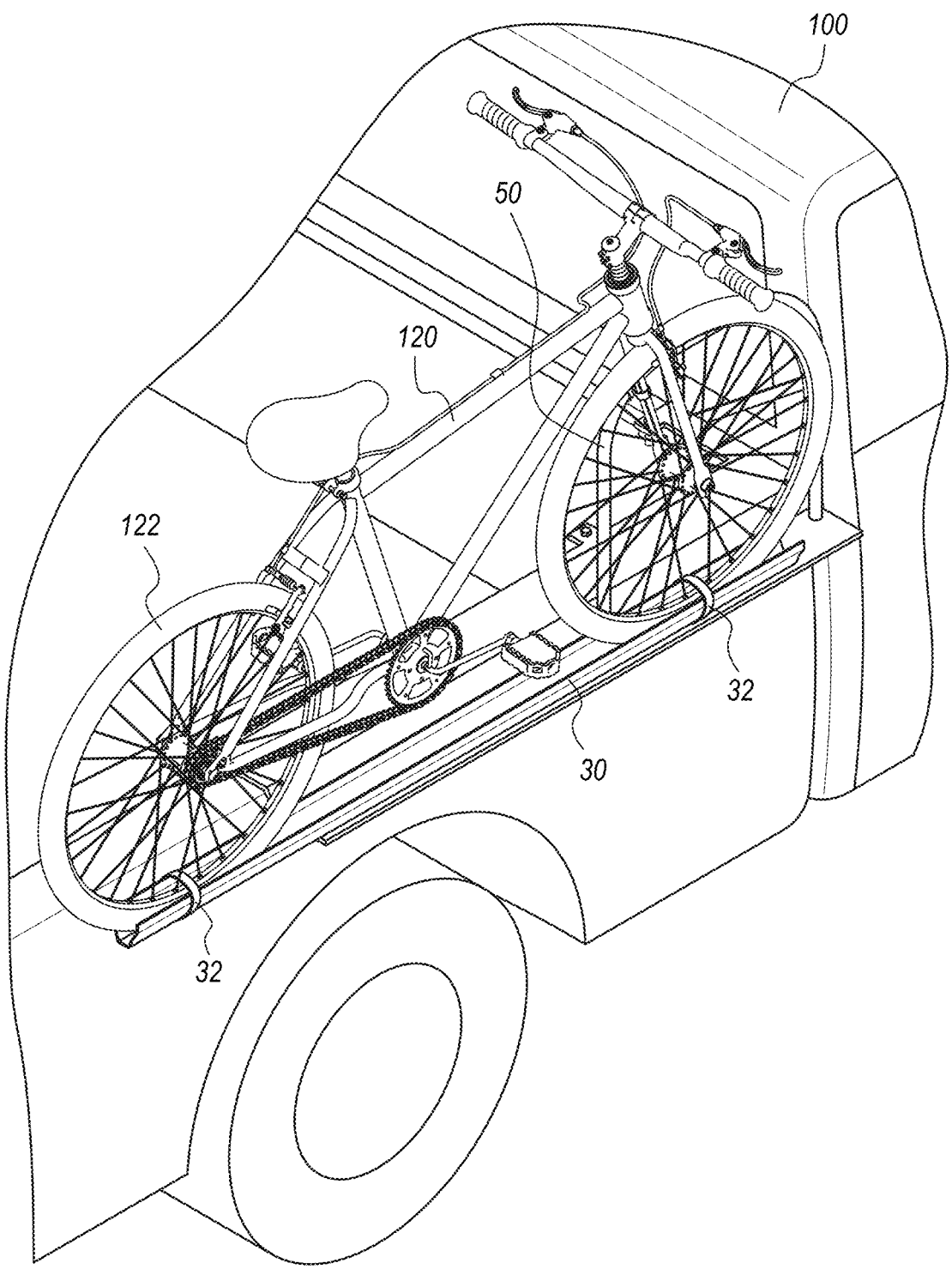
FIG. 6 is a perspective view of the second embodiment of bicycle rack that is reversibly attachable to a pickup truck bed with a bed shell or bed cap mounted on a pickup truck without with a bed shell or bed cap, with a bicycle attached to the bicycle rack.

Alternately, the top plate 12 can be attached directly to the bed 102 of the pickup truck 100 without a bed shell or bed cap 106 installed on the pickup truck 100. Thus, bicycle rack that is reversibly attachable to a pickup truck bed with a bed shell or bed cap 5 can be installed onto a pickup truck 100 with or without a bed shell or bed cap 106. bicycle rack that is reversibly attachable to a pickup truck bed with a bed shell or bed cap 5. Bicycle rack that is reversibly attachable to a pickup truck bed with a bed shell or bed cap 5 is reversibly attached to the bed 102 of a pickup truck 100 without a bed shell or bed cap 106 installed as follows. FIGS. 5 and 6 depict bicycle rack that is reversibly attachable to a pickup truck bed with a bed shell or bed cap 5 reversibly attached to the bed 102 of a pickup truck 100 without a bed shell or bed cap 106.

With a right side configuration, the hole in top plate forward tab is located exactly at the inside corner of the right front corner of the pickup truck bed 102. The hole in top plate center tab 16 is aligned with the inside edge of the right side of the pickup truck bed 102. The hole in top plate rearward tab 18 is aligned the inside edge of the right side of the pickup truck bed 102.

With a left side configuration, the hole in top plate forward tab is located exactly at the inside corner of the left front corner of the pickup truck bed 102. The hole in top plate center tab 16 is aligned the inside edge of the left side of the pickup truck bed 102. The hole in top plate rearward tab 18 is aligned the inside edge of the left side of the pickup truck bed 102.

A clamp bolt 40 is inserted through the hole on the top plate center tab 16 from the upper surface. A clamp bolt 40 is inserted through the hole on the top plate rearward tab 18 from the upper surface. Then a clamp nut 42 is installed onto each of the three clamp bolts 40 from the bottom. Each clamp nut 42 must grab onto a rib or support member on the underside of the pickup truck bed 102. The clamp nuts 42 design for this purpose and are shaped to catch onto existing structure on the pickup truck bed 102. Then all clamp bolts 40 are tightened to specification.

All embodiments of bicycle rack that is reversibly attachable to a pickup truck bed with a bed shell or bed cap 5 are installed onto a pickup truck 100 in the same way that is detailed above.

To mount a bicycle 120 on a rack 5 in this embodiment, a modification to the bed shell or bed cap 106 must be done in order to properly mount a bicycle 120 to the bicycle rack 5 wherein an eye bolt (not depicted) is attached to the exterior surface of the bed shell or bed cap 106 at a location that is commensurate with securing the seat or seat pole of the bicycle 120 thereto. To mount a bicycle 120 on a rack 5 in this embodiment, the bicycle 120 is placed onto the tire cradle 30 with the front of the bicycle 120 facing the front of the pickup truck 100. Then, the bicycle 120 is secured to the eye bolt and each bicycle tire 122 is lashed down to the tire cradle with a tire strap 32. This process is reversed to remove the bicycle 120 from the bicycle rack 5.

A tire strap 32 is a strip of strong flexible material or a length of cordage that functions to keep each bike tire firmly held within the concave area of the tire cradle 30 and firmly on the bottom member of tire cradle 30. In best mode tire strap 32 is a ratchet strap.

In a second embodiment, bicycle rack that is reversibly attachable to a pickup truck bed with a bed shell or bed cap 5 may further comprise a harp member 50

Harp member 50 is a rigid inverted U-shaped member or rigid hoop member. Harp member 50 has: an outside diameter, a forward leg, a rearward leg, and an upper curved portion to form the inverted U shape. The forward leg and rearward leg of harp member 50 are mounted and rigidly attached to the upper surface of bottom plate 24 so that the inverted U shape stands up vertically or near vertically. Thus, the U shape is concave downwards. Harp member 50 is made of tubular material with an outside diameter or outer dimension. Harp member 50 functions as an attachment point for the bicycle seat or seat pole of the bicycle 120. Harp member 50 is an inverted U-shape to provide strength and rigidity and also to provide versatility of attachment point where the bicycle seat or seat pole may be attached to the harp member 50 at any location on the hoop structure, thus providing many possible attachment points along entire length of the hoop structure. Harp member 50 may be made of any known material.

Harp member 50 may be supported by a harp gusset 56. Harp gusset 56 is a rigid oblong support member with: a length, a longitudinal axis, an upper end, and lower end. The upper end of harp gusset 56 is attached to upper curved portion of harp member 50. The lower end of harp gusset is attached to the outer surface of front plate 22. Attachment may be accomplished by any known means such as: weld, solder, glue, epoxy, adhesive, bolts, screws, rivets, clips, snaps, pins, or fasteners. In best mode, attachment is accomplished by fasteners. This arrangement provides a gusset support for harp member 50 to provide substantial support to the harp member 50 and to prevent the harp member 50 from vibrating during travel. Harp gusset 56 may be made of any known material.

To mount a bicycle 120 on a rack 5 in this embodiment, the bicycle 120 is placed onto the tire cradle 30 with the front of the bicycle 120 facing the front of the pickup truck 100. Then, the bicycle 120 is secured to the harp member 50 and each bicycle tire 122 is lashed down to the tire cradle with a tire strap 32. This process is reversed to remove the bicycle 120 from the bicycle rack 5.

The above describes the second embodiment of bicycle rack that is reversibly attachable to a pickup truck bed with a bed shell or bed cap 5. The second embodiment is depicted in FIGS. 2-7 and claimed in claim 2.

In a third embodiment, harp member 50 may further comprise: a first harp hinge 51; second harp hinge 52; a first harp sleeve 53; and second harp sleeve 54. In this configuration, the harp member 50 is retractable. First and second harp hinges 51,52 are each a hinge mechanism to allow the harp member 60 to fold down or retract when not in use.

First harp hinge 51 is a hinge member, pivoting bearing member, or movable joint or mechanism on the forward leg of the harp member 50. The first harp hinge 51 is located at the bottom of forward leg, adjacent to the bottom plate 24.

Second harp hinge 52 is a hinge member, pivoting bearing member, or movable joint or mechanism on the rearward leg of the harp member 50. The second harp hinge 52 is located at the bottom of reward leg, adjacent to the bottom plate 24.

First harp sleeve 53 is a rigid cylindrical member with open ends. The inside diameter of first harp sleeve 53 is sized to make a slip fit or clearance fit with the outside diameter of harp member 50. First harp sleeve 53 functions to lock first harp hinge 52 in the extended position, by sliding over first harp hinge 51, and remaining there during extension of the harp member 5, to cover the first harp hinge 51, and prevent first harp hinge 51 from bending or pivoting, and thereby locking first harp hinge 51 and the harp member 50 in the extended position.

Second harp sleeve 54 is a rigid cylindrical member with open ends. The inside diameter of second harp sleeve 54 is sized to make a slip fit or clearance fit with the outside diameter of harp member 50. Second harp sleeve 54 functions to lock second harp hinge 52 in the extended position, by sliding over second harp hinge 52, and remaining there during extension of the harp member 5, to cover the second harp hinge 52, and prevent second harp hinge 52 from bending or pivoting, and thereby locking second hinge 52 and the harp member 50 in the extended position.

Figure 9:
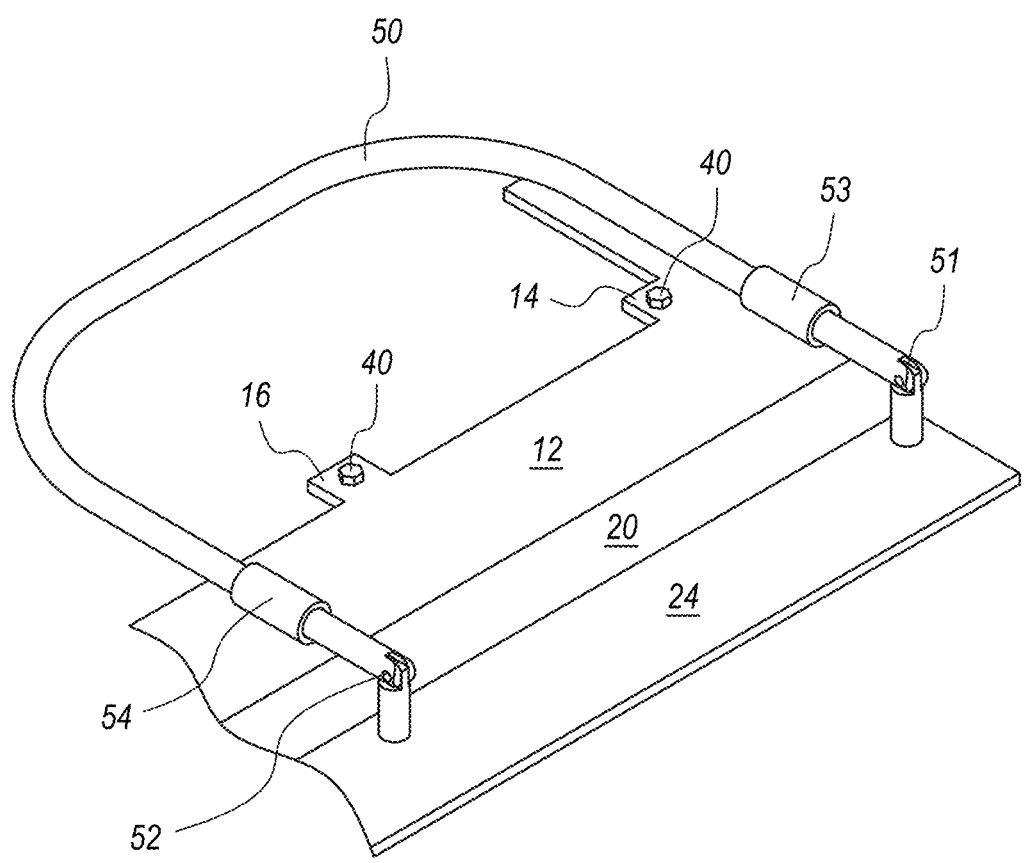
FIG. 9 is an enlarged view of a retractable harp member in the retracted position which is in the third embodiment.

In order to retract the harp member 50, the harp gusset 56 is removed wherein the upper end of harp gusset 56 is removed from the harp member 50 and the lower end of harp gusset 56 is removed from the front plate 22. Then the first and second harp sleeves 53,54 are slid upwards or lifted upwards to allow the first and second harp hinges 51,52 to bend or pivot downwards, thereby retracting the harp hinge 52. Retracted harp member is depicted in FIG. 9.

Figure 8:
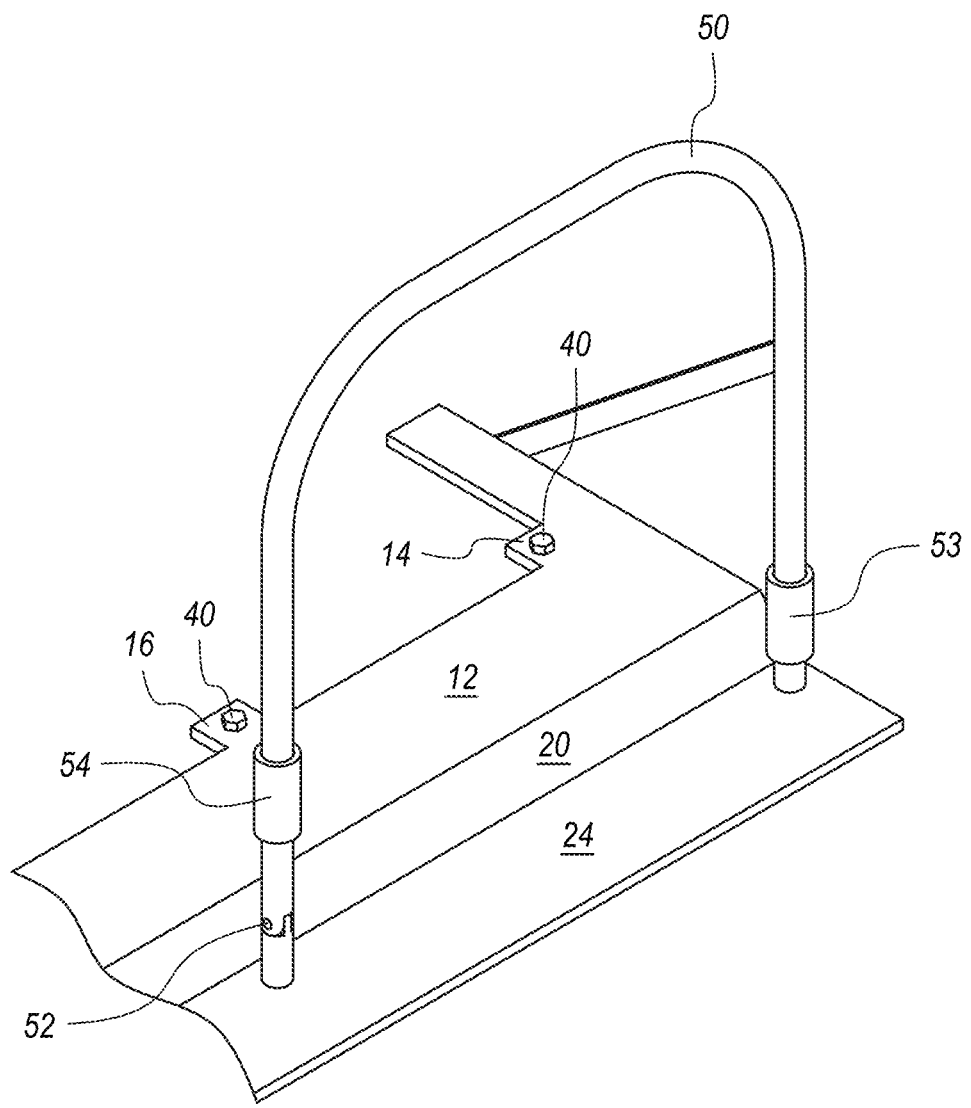
FIG. 8 is an enlarged view of a retractable harp member in the upright position which is in the third embodiment.

In order to extend the harp member 50, the harp member 50 is raised or pivoted upwards to allow both harp sleeves 54 to fall down and cover both harp hinges 51,52. Then the harp gusset 56 is reattached. In best mode, harp gusset 56 is attached with fasteners. Extended harp member is depicted in FIG. 8.

To mount a bicycle 120 on a rack 5 in this embodiment, the bicycle 120 is placed onto the tire cradle 30 with the front of the bicycle 120 facing the front of the pickup truck 100. Then, the bicycle 120 is secured to the harp member 50 and each bicycle tire 122 is lashed down to the tire cradle with a tire strap 32. This process is reversed to remove the bicycle 120 from the bicycle rack 5.

The above describes the third embodiment of bicycle rack that is reversibly attachable to a pickup truck bed with a bed shell or bed cap 5. The third embodiment is depicted in FIGS. 8-9 and claimed in claim 3.

In a fourth embodiment, the harp member 50 and all attachments are deleted and replaced with a ratcheting hook member 60 and a hook member mounting bar 62. In this embodiment, bicycle rack that is reversibly attachable to a pickup truck bed with a bed shell or bed cap 5 comprises: a base plate assembly 10; a tire cradle 30; a ratcheting hook member 60; and a hook member mounting bar 62.

In this embodiment, base plate assembly 10 and tire cradle 30 are exactly as described above.

Hook member mounting bar 62 is a rigid vertical support member or column. Hook member mounting bar 62 has an outer diameter or outer dimension, a length, a longitudinal axis, a lowed end, a middle section, and an upper end. The lower end of hook member mounting bar 62 is rigidly attached to the upper surface of bottom plate 24, side plate 20, or top plate 12 so that the longitudinal axis of hook member mounting bar 62 is perpendicular to the longitudinal axis of tire cradle 30. Rigid attachment may be accomplished by any known means such as: weld, solder, glue, epoxy, adhesive, bolts, screws, rivets, clips, snaps, pins, or fasteners. The lower end of hook member mounting bar 62 may optionally include a hinge and a sleeve configuration to make it retractable as described above with the harp member.

Figure 10:
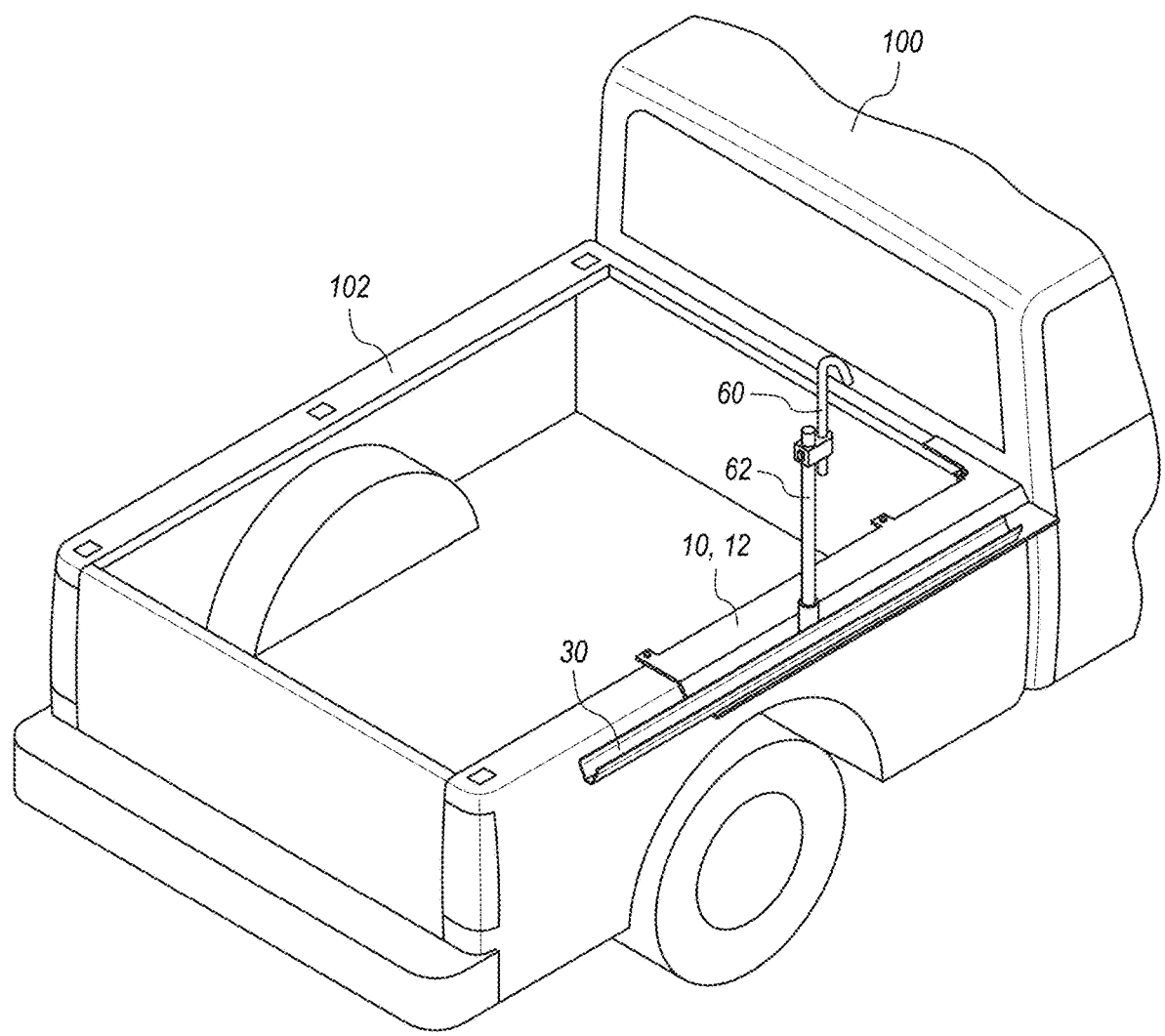
FIG. 10 is a perspective view of the fourth embodiment of bicycle rack that is reversibly attachable to a pickup truck bed with a bed shell or bed cap mounted on a pickup truck without a bed shell or bed cap.

Ratcheting hook member 60 is a rigid hook-shaped member with its concave curve facing downwards. Ratcheting hook member 60 is attached to a ratcheting base that is slidably attached to the hook member mounting bar 62 so that the ratcheting base and the ratcheting hook member 60 may be adjusted upwards and downward along the full length of hook member mounting bar 62. Ratcheting base may allow for "ratcheted" slidable attachment that allows the hook member mounting bar 62 to slide downward freely but then have all upward movement restricted or locked by the ratchet mechanism. Ratcheted slidable attachment means hook member mounting bar 62 freely slides downwards but is restricted from any upward movement with first releasing a ratchet catch. This embodiment is depicted in FIG. 10. Ratcheting hook member 60 and a hook member mounting bar 62 function in tandem to clamp and hold bicycle 120 within tire cradle 30 for secure attachment of a bicycle 120 to the bicycle rack that is reversibly attachable to a pickup truck bed with a bed shell or bed cap 5.

Figure 11:
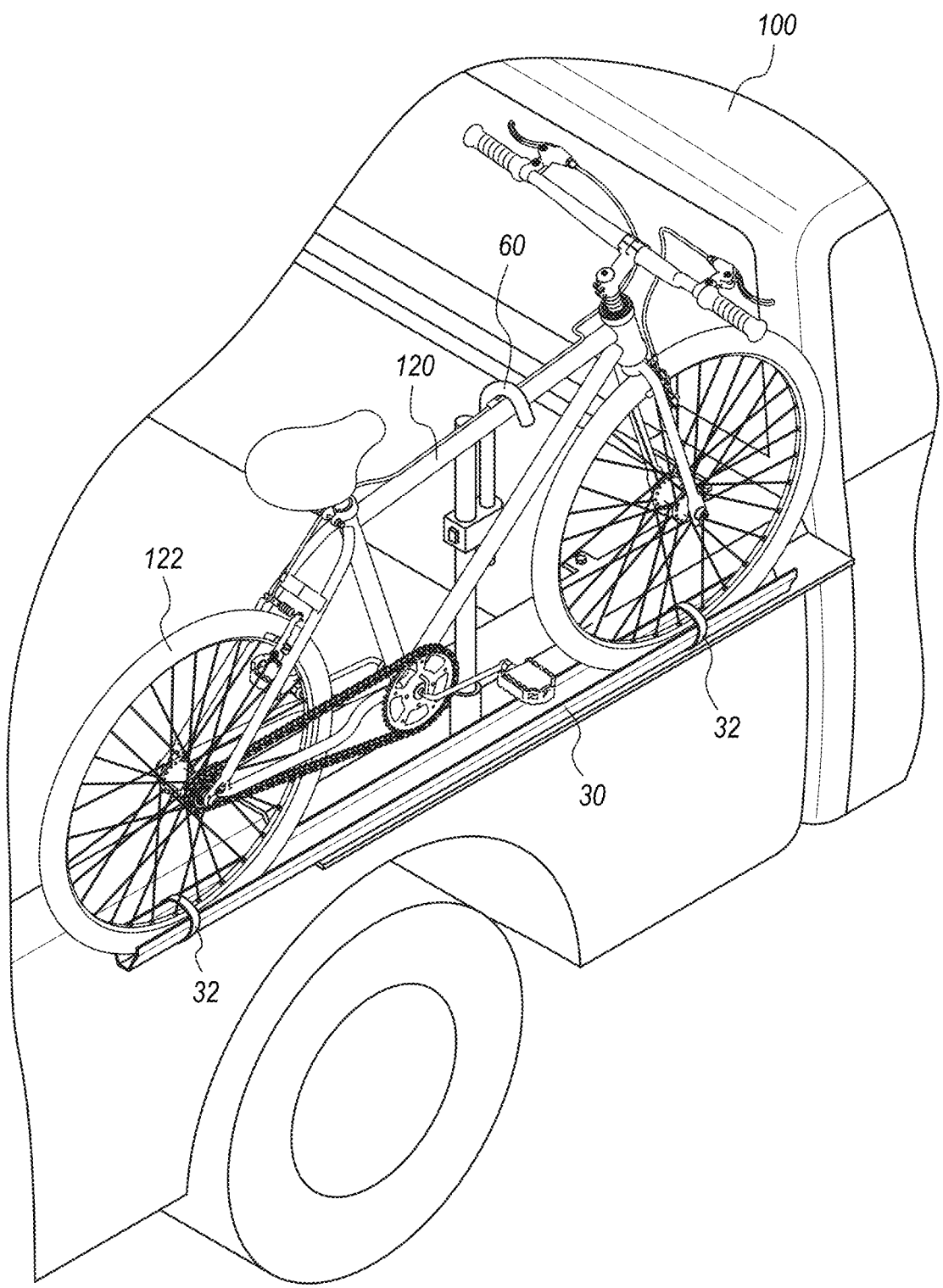
FIG. 11 is a perspective view of the fourth embodiment of bicycle rack that is reversibly attachable to a pickup truck bed with a bed shell or bed cap mounted on a pickup truck without a bed shell or bed cap, with a bicycle attached to the bicycle rack.

In order to mount a bicycle 120 to a rack 5 in this embodiment, the ratcheting hook member 60 is raised all the way up to the upper end of hook member mounting bar 62, and then the bicycle 120 is placed onto the tire cradle 30 so that the two tires of the bicycle 120 are resting on the bottom of the tire cradler 30. The bicycle 120 is placed in a vertical condition and the ratcheting hook member is ratcheting downward to clamp onto a bar of the bicycle 120. Then, the bicycle 120 is secured to the harp member 50 and each bicycle tire 122 is lashed down to the tire cradle with a tire strap 32, as depicted in FIG. 11. This process is reversed to remove the bicycle 120 from the bicycle rack 5.

The above describes the fourth embodiment of bicycle rack that is reversibly attachable to a pickup truck bed with a bed shell or bed cap 5. The fourth embodiment is depicted in FIGS. 10-11 and claimed in claim 4.

Figure 12:
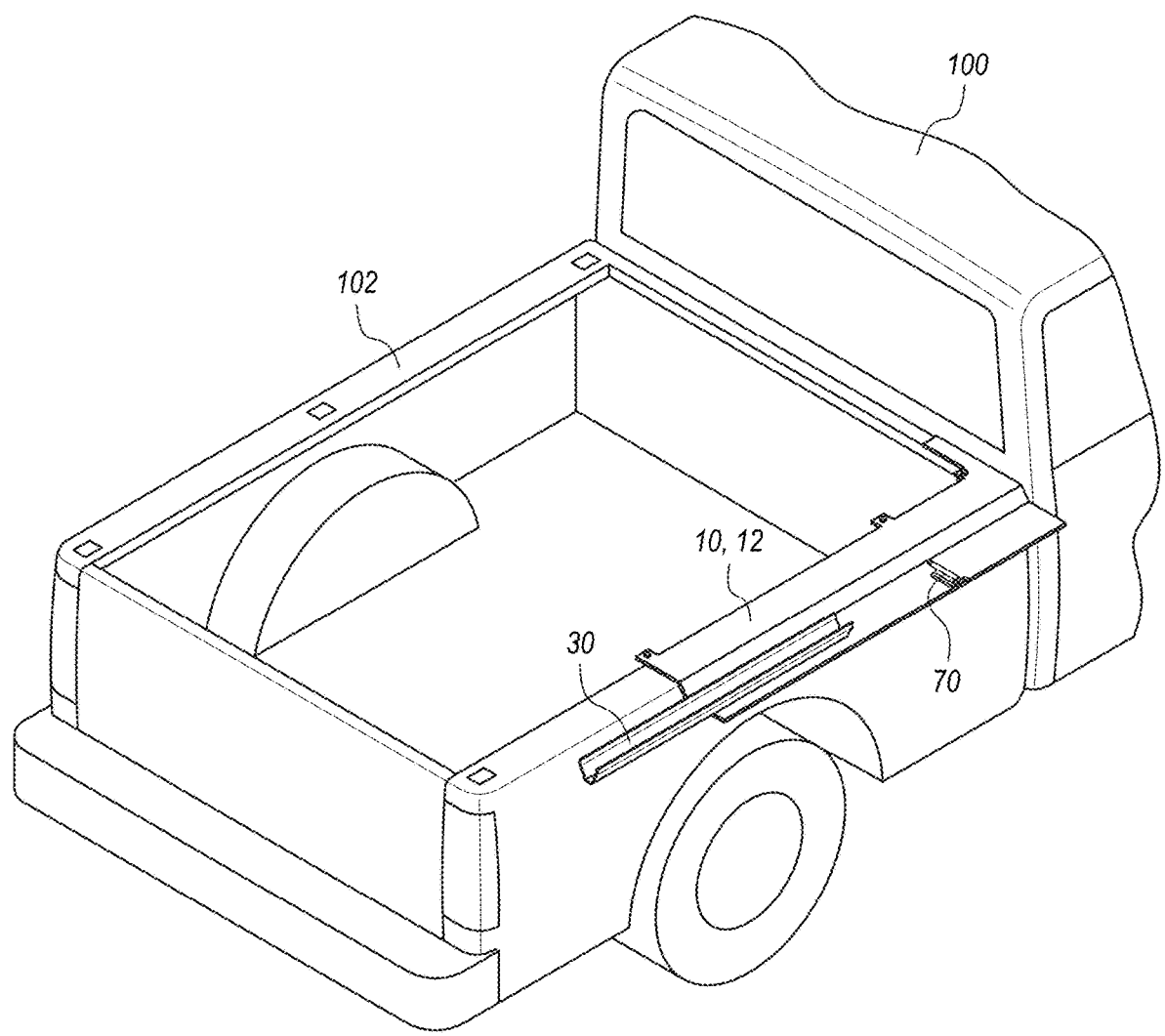
FIG. 12 is a perspective view of the fifth embodiment of bicycle rack that is reversibly attachable to a pickup truck bed with a bed shell or bed cap mounted on a pickup truck without a bed shell or bed cap.
Figure 13:
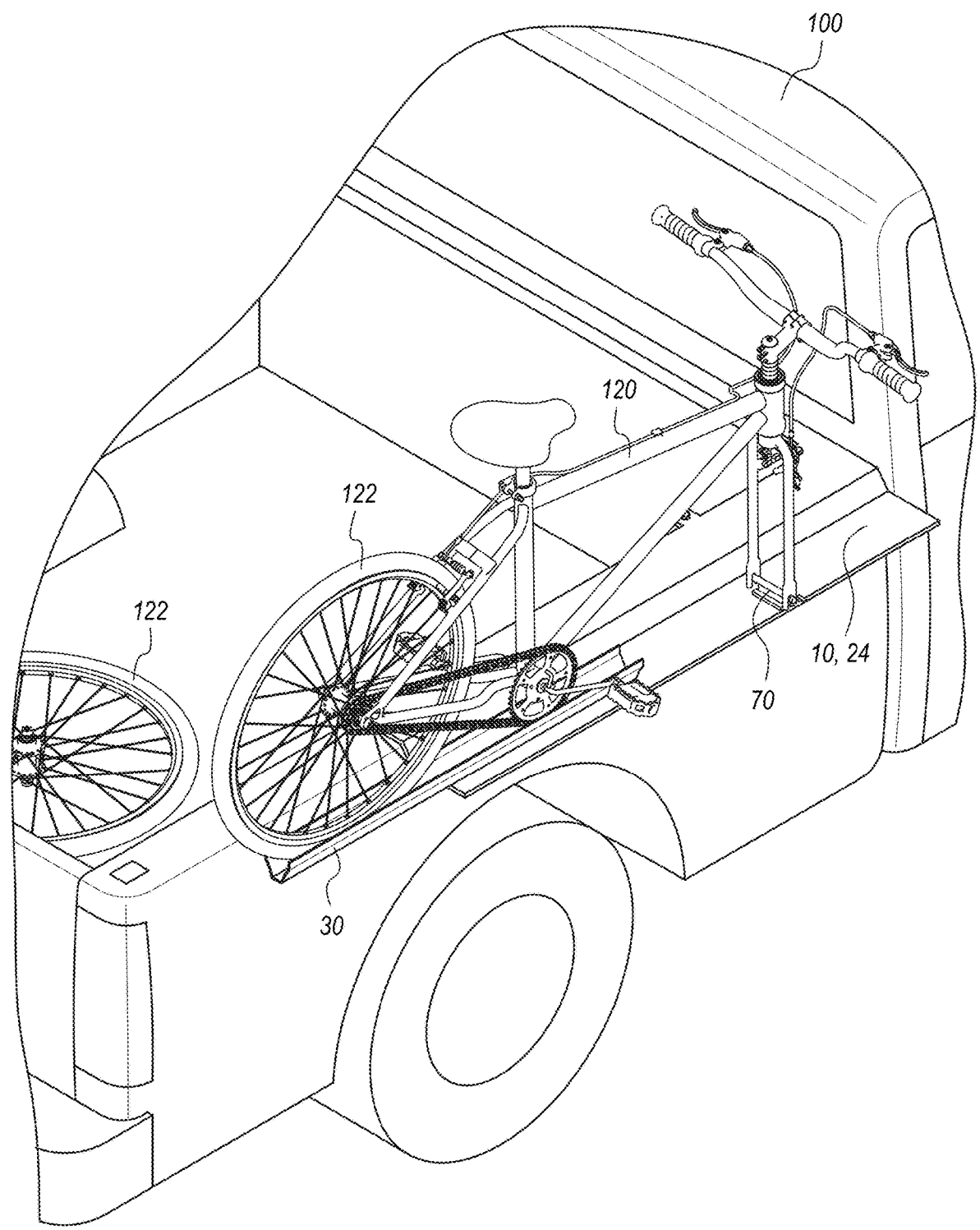
FIG. 13 is a perspective view of the fifth embodiment of bicycle rack that is reversibly attachable to a pickup truck bed with a bed shell or bed cap mounted on a pickup truck without a bed shell or bed cap, with a bicycle attached to the bicycle rack.

In a fifth embodiment, an axle latch 70 is used to secure a bicycle 120 to the bike rack 5. In this embodiment, the length of the tire cradle 30 is shortened so that the tire cradle 30 is only underneath the rear section of bicycle 120 and not the front section of the bicycle 120 as depicted in FIGS. 12 and 13. The front half of the tire cradle 30 is deleted and replaced with an axle latch 70, as depicted in FIG. 12. Axle latch 70 is a special bracket that is reversibly rigidly attachable to the front fork of a bicycle 120, after the front wheel has been removed from the bicycle 120. Every bicycle wheel has an axle. When the front wheel is removed from the bicycle, the axle of the wheel goes with it, leaving the front fork of the bicycle 120 without an axle. The axle on the front wheel reversibly rigidly attaches to the front fork of the bicycle 120.

Axle latch 70 is bracket with an axle mounted on top of the bracket wherein the front fork of a bicycle 120 is reversibly rigidly attachable to the axle on the axle latch 70. The axle on the axle latch 70 attaches to the front fork of a bicycle 120 in the same way that the axle on the front bicycle wheel attaches to the front fork of the bicycle 120. The axle on the axle latch 70 is the same as the axle on the front wheel of a bicycle 120. Axle latch 70 has a base with an upper surface and a lower surface. The axle on the axle latch 70 is rigidly attached to the upper surface of the base so that both ends of the axle are free and clear from obstruction and otherwise in a manner that is reversibly rigidly attachable to the front fork of a bicycle. The axle on the axle latch has a longitudinal axis that is horizontal and perpendicular to that of bottom plate 24 and tire cradle 30. The lower surface of the base is rigidly attached to the upper surface of bottom plate 24. Rigid attachment may be accomplished by any known means such as: weld, solder, glue, epoxy, adhesive, bolts, screws, rivets, clips, snaps, pins, or fasteners.

In order to mount a bicycle 120 to a rack 5 in this embodiment, the front wheel is first removed from the bicycle 120. Then the front fork of the bicycle 120 is attached to the axle latch 70 as depicted in FIG. 13. The rear tire of the bicycle 120 rests in tire cradle 30 as with other embodiments. This process is reversed to remove the bicycle 120 from the bicycle rack 5.

The above describes the fifth embodiment of bicycle rack that is reversibly attachable to a pickup truck bed with a bed shell or bed cap 5. The fifth embodiment is depicted in FIGS. 12-13 and claimed in claim 5.

In a sixth embodiment, bicycle rack that is reversibly attachable to a pickup truck bed with a bed shell or bed cap 5 is a double bicycle or two bicycle rack. This embodiment is similar to the second embodiment that further comprising a second tire cradle 34. In this embodiment, bicycle rack that is reversibly attachable to a pickup truck bed with a bed shell or bed cap 5 comprises: a base plate assembly 10; a tire cradle 30; a harp member 50; a second tire cradle 34; and a second tire cradle attachment bracket 36. In this embodiment, base plate assembly 10, tire cradle 30, and harp member 50 are exactly as described above. As stated, there is an addition of a second tire cradle 34. Second tire cradle 34 is an exact duplicate of tire cradle 30.

Second tire cradle attachment bracket 36 is a rigid structural member with a first end and a second end. The first end of second tire cradle attachment bracket 36 is rigidly attached to the top plate 12. The second end of second tire cradle attachment bracket 36 is rigidly attached to the lower surface of second tire cradle 34. Rigid attachment may be accomplished by any known means such as: weld, solder, glue, epoxy, adhesive, bolts, screws, rivets, clips, snaps, pins, or fasteners.

Second tire cradle 34 is rigidly attached so that the longitudinal axis of second tire cradle 34 is parallel and co-planar with that of tire cradle 30 and even with tire cradle 30 so that the front end of tire cradle 30 is even with and aligned with the front end of second tire cradle 34 and the rear end of tire cradle 30 is even with and aligned with the rear end of second tire cradle 34. Rigid attachment is accomplished through second tire cradle attachment bracket 36.

In order to mount two bicycles 120 onto a rack 5 in this embodiment, a bicycle 120 is placed onto tire cradle 30 with the front of the bicycle 120 facing the front of the pickup truck 100 and a second bicycle 120 is placed onto second tire cradle 34 with the front of the bicycle 120 facing the front of the pickup truck 100. Then, the bicycles 120 are secured to the harp member 50 and each bicycle tire 122 is lashed down to the tire cradle with a tire strap 32. This process is reversed to remove the bicycles 120 from the bicycle rack 5.

Figure 14:
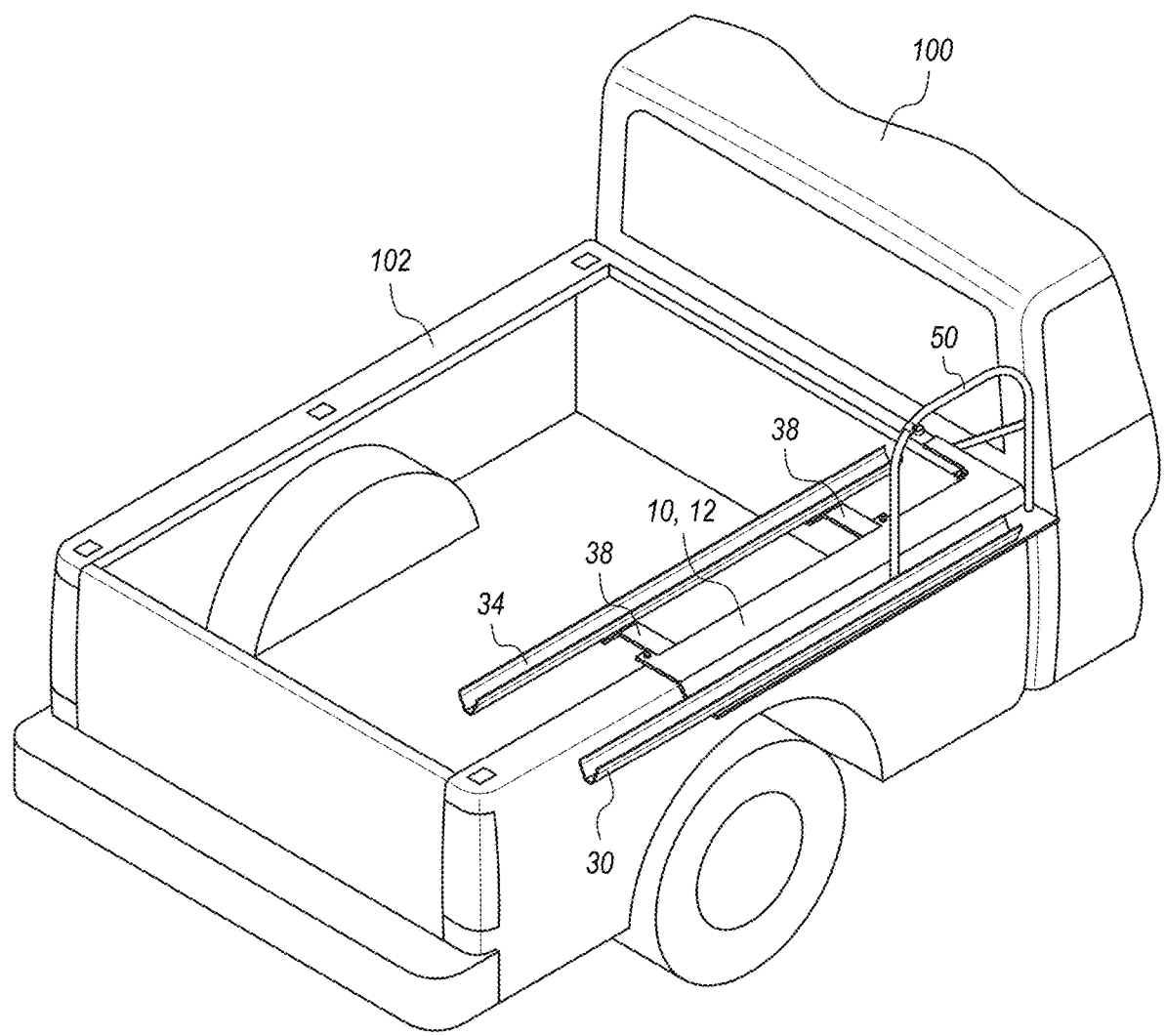
FIG. 14 is a perspective view of the sixth embodiment of bicycle rack that is reversibly attachable to a pickup truck bed with a bed shell or bed cap mounted on a pickup truck without a bed shell or bed cap, without any bicycles attached.
Figure 15:
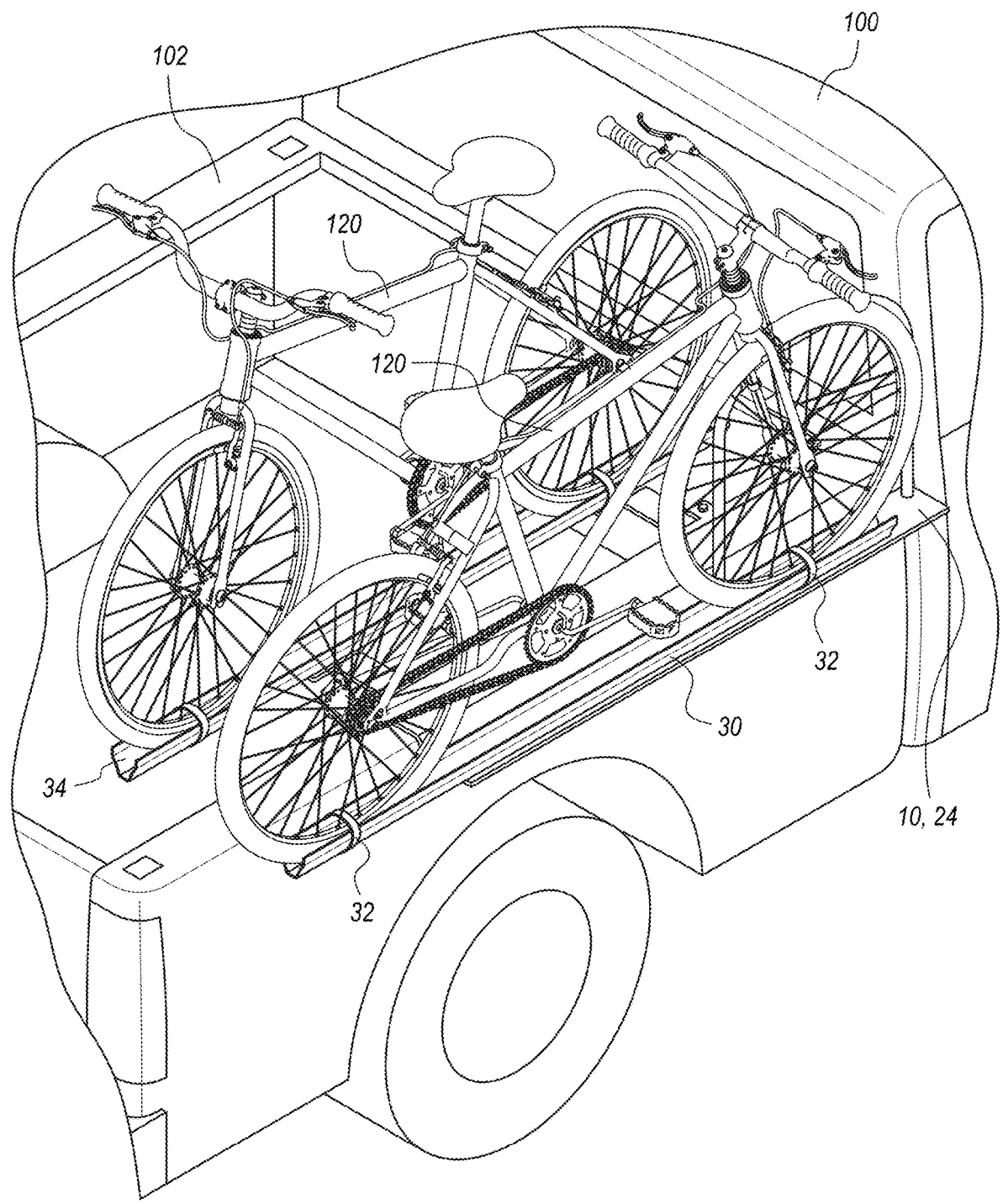
FIG. 15 is a perspective view of the sixth embodiment of bicycle rack that is reversibly attachable to a pickup truck bed with a bed shell or bed cap mounted on a pickup truck without a bed shell or bed cap, with two bicycles attached to the bicycle rack.

The above describes the sixth embodiment of bicycle rack that is reversibly attachable to a pickup truck bed with a bed shell or bed cap 5. The sixth embodiment is depicted in FIGS. 14-15 and claimed in claim 6.

Figure 16:
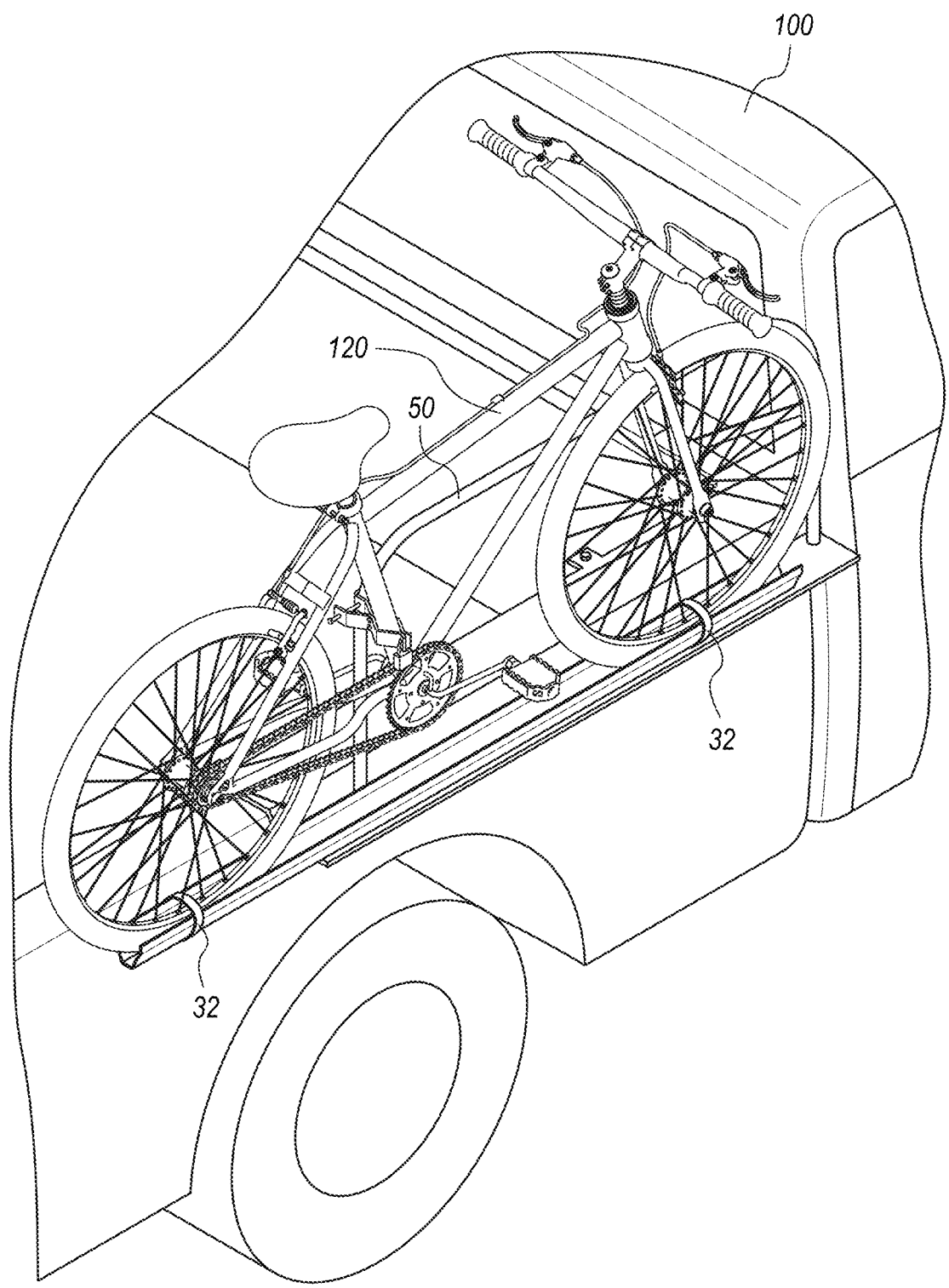
FIG. 16 is a perspective view of the second embodiment of bicycle rack that is reversibly attachable to a pickup truck bed with a bed shell or bed cap mounted on a pickup truck without a bed shell or bed cap, with a bicycle attached to the bicycle rack by a special jaws clamp with a pad lock.

FIG. 16 depicts the first embodiment but with a special jaws clamp with pad lock used to secure and lock the bicycle 120 onto rack 5. Thus, a bicycle 120 may be locked on the bicycle rack 5.

Figure 17:
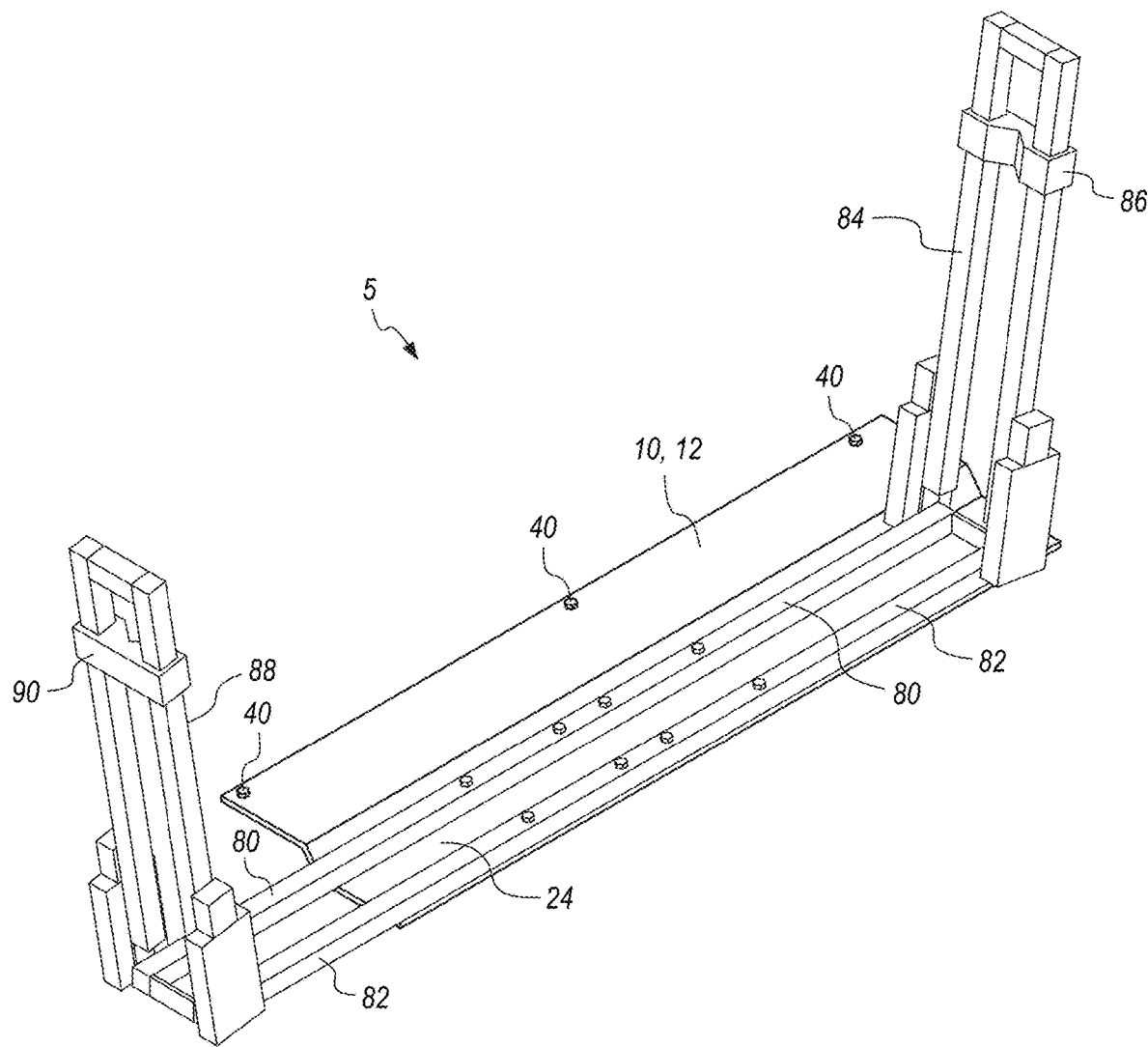
FIG. 17 is a perspective view of the seventh embodiment of bicycle rack that is reversibly attachable to a pickup truck bed with a bed shell or bed cap.
Figure 18:
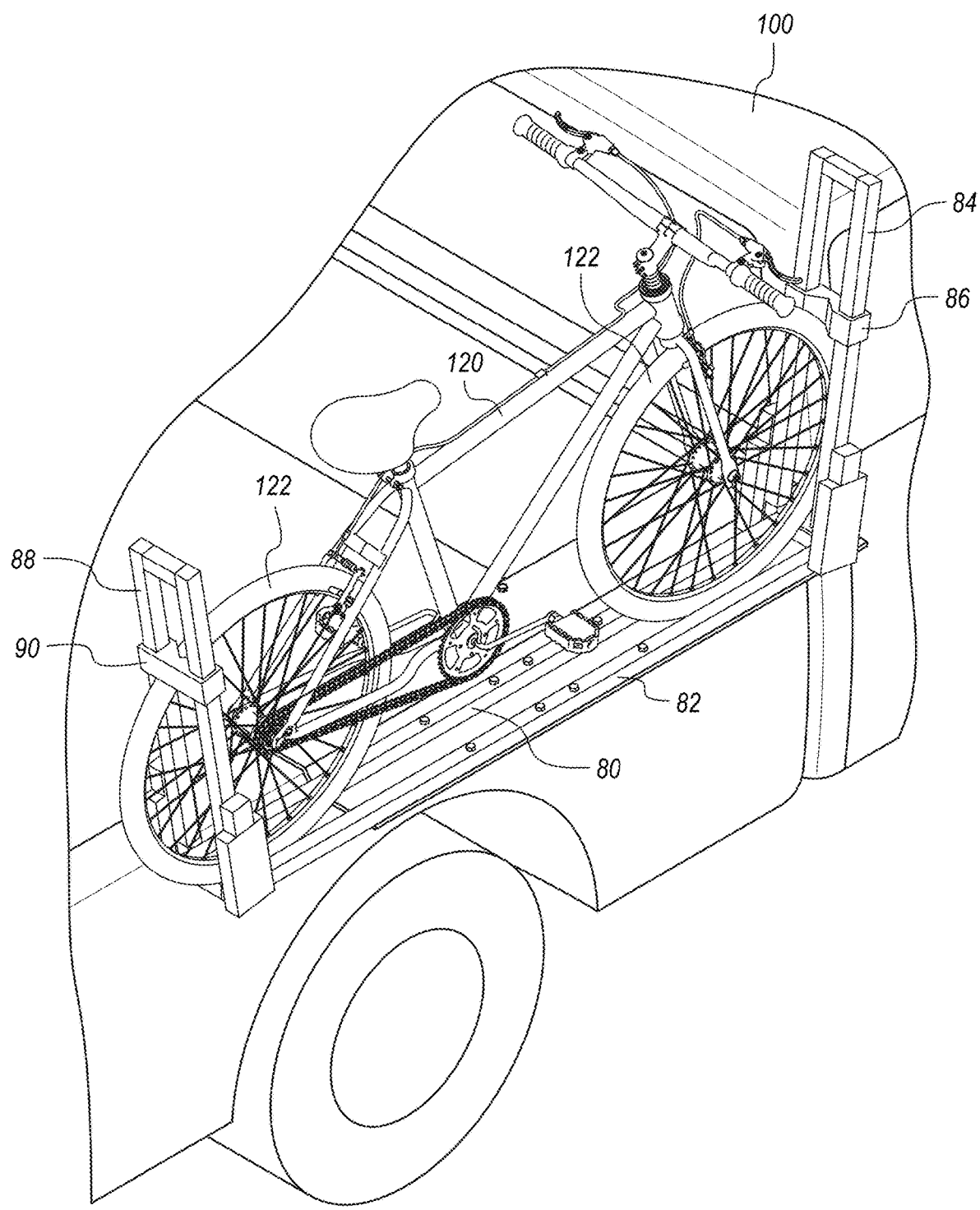
FIG. 18 is a perspective view of the seventh embodiment of bicycle rack that is reversibly attachable to a pickup truck bed with a bed shell or bed cap mounted on a pickup truck without a bed shell or bed cap, with a bicycle attached to the bicycle rack.
Figure 19:
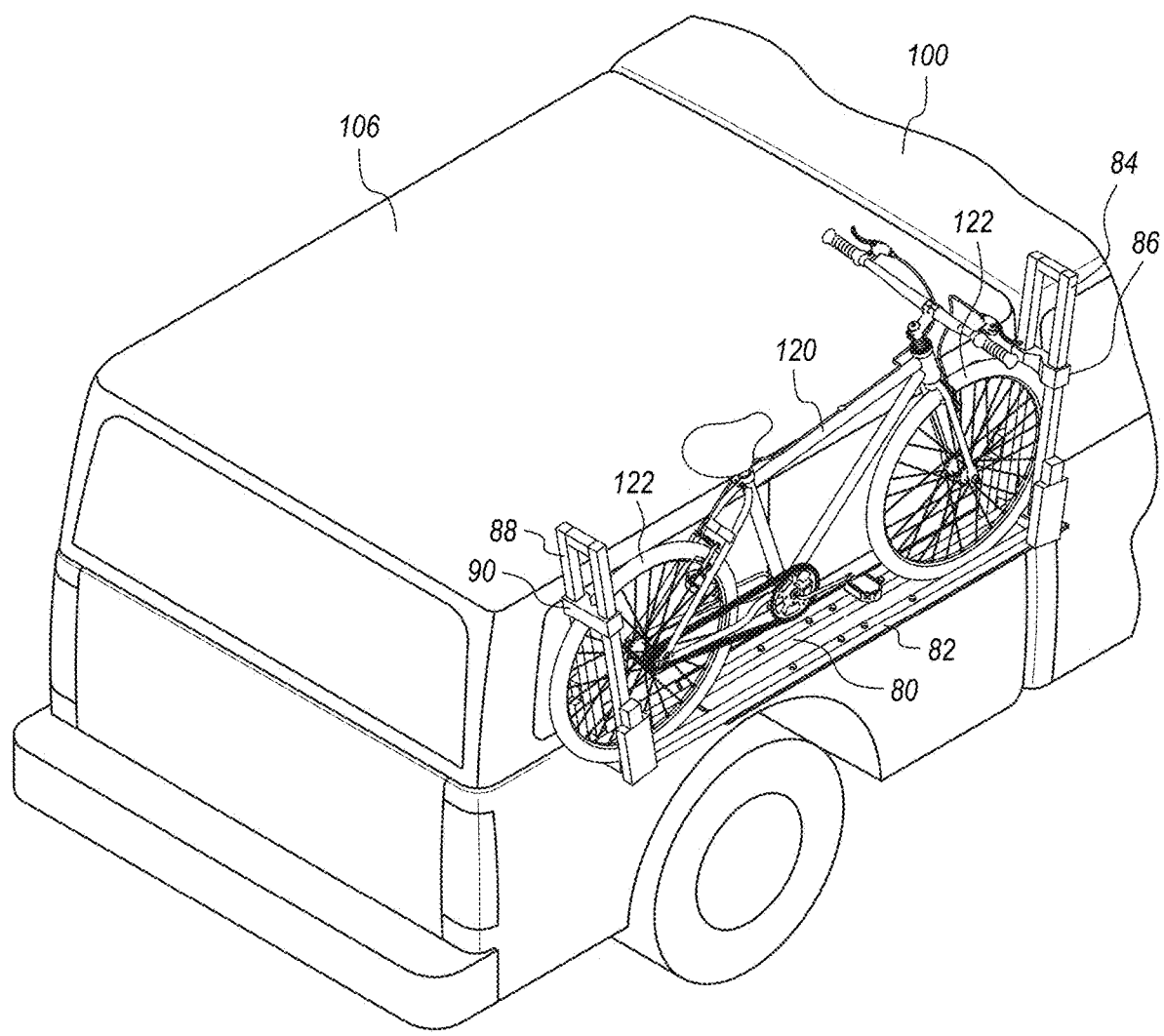
FIG. 19 is a perspective view of the seventh embodiment of bicycle rack that is reversibly attachable to a pickup truck bed with a bed shell or bed cap mounted on a pickup truck with a bed shell or bed cap, with a bicycle attached to the bicycle rack.

In a seventh embodiment, bicycle rack that is reversibly attachable to a pickup truck bed with a bed shell or bed cap 5 comprises: a base plate assembly 10; an inner base rail 80; an outer base rail 82; a front stanchion assembly 84; a front ratcheting tire clamp 86; a rear stanchion assembly 88; and a rear ratcheting tire clamp 90. In this embodiment, base plate assembly 10 is exactly as described above. The seventh embodiment is depicted in FIGS. 17-19 and claimed in claim 7.

Inner base rail 80 is a rigid horizontal structural member. Inner base rail 80 has a length, a width, a height, an upper surface, a lower surface, an inner surface, an outer surface, a front end, a rear end, and a longitudinal axis. The length of inner base rail 80 is longer than a bicycle's axle-to-axle distance but shorter than a bicycle's outer length dimension or tire-to-tire dimension. In best mode, inner base rail 80 is a length of square or rectangular tubing or solid material.

Outer base rail 82 is a rigid horizontal structural member. Outer base rail 82 has a length, a width, a height, an upper surface, a lower surface, an inner surface, an outer surface, a front end, a rear end, and a longitudinal axis. Outer base rail 82 is a duplicated of inner base rail 80. In best mode, outer base rail 82 is a length of square or rectangular tubing or solid material.

The lower surface of inner base rail 80 is rigidly attached to the upper surface of top plate 12 so that the longitudinal axis of inner base rail 80 is parallel with the longitudinal axis of top plate 12. The lower surface of outer base rail 82 is rigidly attached to the upper surface of top plate 12 so that the longitudinal axis of outer base rail 82 is parallel with the longitudinal axis of top plate 12 and the longitudinal axis of inner base rail 80. The front end of inner base rail 80 is aligned with and even with the front end of outer base rail 82. The rear end of inner base rail 80 is aligned with and even with the rear end of outer base rail 82. The distance between the outer surface of inner base rail 80 and the inner surface of outer base rail 82 is slightly larger than the width of a bicycle tire 122 so that a bicycle tire 122 may freely slide into this gap. Rigid attachment may be accomplished by any known means such as: weld, solder, glue, epoxy, adhesive, bolts, screws, rivets, clips, snaps, pins, or fasteners. In best mode, attachment is accomplished by fasteners, as depicted. Note that the length of bottom plate 24 can be shorter than the length of inner and outer base rails 80,82 as depicted.

Front stanchion assembly 84 comprises an inner stanchion and an outer stanchion. Inner stanchion on front stanchion assembly is a rigid near vertical structural member. Inner stanchion has a length, a width, a height, an upper end, a lower end, an inner surface, an outer surface, a front surface, a rear surface, and a longitudinal axis. In best mode, inner stanchion is a length of square or rectangular tubing or solid material. Outer stanchion on front stanchion assembly is a rigid near vertical structural member. Outer stanchion has a length, a width, a height, an upper end, a lower end, an inner surface, an outer surface, a front surface, a rear surface, and a longitudinal axis. Outer stanchion is a duplicate of inner stanchion. In best mode, outer stanchion is a length of square or rectangular tubing or solid material.

The outer surface of the lower end of inner stanchion is pivotally attached to the inner surface of the front end of inner base rail 80. The inner surface of the lower end of outer stanchion is pivotally attached to the outer surface of the front end of outer base rail 82. Pivotal attachment is such that inner and outer stanchions may be rotated to any position along the half circle and then locked into that position for rigid attachment in that position. Any know method of such pivotal attachment may be used.

The outer surface of the upper end of inner stanchion is rigidly attached to the inner surface of the upper end of outer stanchion so that the upper end of inner stanchion is even with and aligned with the upper end of outer stanchion and the longitudinal axes of inner and outer stanchions are parallel with an even continuous gap there between. This is accomplished by a structural member with a first end rigidly attached to the outer surface of the upper end of inner stanchion and a second end rigidly attached to the inner surface of the upper end of the outer stanchion.

Front stanchion assembly 84 rotates around the attachment points to inner and outer base rails 80,82, which are pivot points. Front stanchion assembly 84 may be rotated from a zero to 180 degrees between front stanchion assembly 84 and the inner and outer base rails 80,82. Thus, front stanchion assembly 84 may be rotated to zero degrees when not in use and not carrying a bicycle 120 and then all the back out to 180 degrees when mounting a bicycle 120 on the bicycle rack 5.

Front ratcheting tire clamp 86 is a rigid horizontal structural member that is slidably attached to inner and outer stanchions on front stanchion assembly 84. The slidable attachment is such that front ratcheting tire clamp 86 remains perpendicular to inner and outer stanchions on front stanchion assembly 84 while it slides upwards and downwards along the lengths or longitudinal axes of inner and outer stanchions on front stanchion assembly 84. Further the slidable attachment is biased or ratcheted in that the front ratcheting tire clamp 86 freely slides downwards but is restricted from any upward movement with first releasing a ratchet catch.

Rear stanchion assembly 88 comprises an inner stanchion and an outer stanchion. Inner stanchion on rear stanchion assembly is a rigid near vertical structural member. Inner stanchion has a length, a width, a height, an upper end, a lower end, an inner surface, an outer surface, a front surface, a rear surface, and a longitudinal axis. In best mode, inner stanchion is a length of square or rectangular tubing or solid material. Outer stanchion on rear stanchion assembly is a rigid near vertical structural member. Outer stanchion has a length, a width, a height, an upper end, a lower end, an inner surface, an outer surface, a front surface, a rear surface, and a longitudinal axis. Outer stanchion is a duplicate of inner stanchion. In best mode, outer stanchion is a length of square or rectangular tubing or solid material.

The outer surface of the lower end of inner stanchion is pivotally attached to the inner surface of the front end of inner base rail 80. The inner surface of the lower end of outer stanchion is pivotally attached to the outer surface of the front end of outer base rail 82. Pivotal attachment is such that inner and outer stanchions may be rotated to any position along the half circle and then locked into that position for rigid attachment in that position. Any know method of such pivotal attachment may be used.

The outer surface of the upper end of inner stanchion is rigidly attached to the inner surface of the upper end of outer stanchion so that the upper end of inner stanchion is even with and aligned with the upper end of outer stanchion and the longitudinal axes of inner and outer stanchions are parallel with an even gap there between. This is accomplished by a structural member with a first end rigidly attached to the outer surface of the upper end of inner stanchion and a second end rigidly attached to the inner surface of the upper end of the outer stanchion.

Rear stanchion assembly 88 rotates around the attachment points to inner and outer base rails 80,82, which are pivot points. Rear stanchion assembly 88 may be rotated from a zero to 180 degrees between front rear stanchion assembly 88 and the inner and outer base rails 80,82. Thus, rear stanchion assembly 88 may be rotated to zero degrees when not in use and not carrying a bicycle 120 and then all the back out to 180 degrees when mounting a bicycle 120 on the bicycle rack 5.

Rear ratcheting tire clamp 90 is a rigid horizontal structural member that is slidably attached to inner and outer stanchions on rear stanchion assembly 88. The slidable attachment is such that rear ratcheting tire clamp 90 remains perpendicular to inner and outer stanchions on rear stanchion assembly 88 while it slides upwards and downwards along the lengths or longitudinal axes of inner and outer stanchions on rear stanchion assembly 88. Further the slidable attachment is biased or ratcheted in that the rear ratcheting tire clamp 90 freely slides downwards but is restricted from any upward movement with first releasing a ratchet catch.

A bicycle 120 is mounted to this embodiment as follows. The front stanchion assembly 84 is rotated forwards towards the front of the pickup truck 100 to the 180-degree location described above. The front stanchion assembly 88 is rotated rearwards toward the rear of the pickup truck 100 to the 180-degree location described above. Then, the bicycle 120 is placed in between the inner base rail 80 and the outer base rail 82 by placing the two bicycle tires in between the inner base rail 80 and the outer base rail 82. Next, the front station assembly 84 is rotated backward toward the rear of the pickup truck 100 to a point where front ratcheting tire clamp 86 is located above the front tire of the bicycle 120 and rigidly locked in this position.

Then, the front ratcheting tire clamp 86 is slid downwards to firmly press downward against the front tire of the bicycle 120. Next, the rear station assembly 88 is rotated forwards toward the front of the pickup truck 100 to a point where rear ratcheting tire clamp 90 is located above the rear tire of the bicycle 120 and rigidly locked in this location. Then, the rear ratcheting tire clamp 90 is slid downwards to firmly press downward against the rear tire of the bicycle 120. Thereby mounting a bicycle 120 to this embedment, as depicted in FIGS. 18-19.

This process is reversed to remove the bicycle 120 from the bicycle rack 5.

What is claimed is:

1. A bicycle rack comprising: a base plate assembly and a tire cradle, wherein, said base plate assembly comprises: a top plate; a side plate; a front plate; and a bottom plate, said top plate is a rigid planar L-shaped horizontal member or sheet of material with a plane, a front edge, a first rear edge, a second rear edge, an outer edge, a first inner edge, a second inner edge, an upper surface, a lower surface, a thickness, a longitudinal axis, and a latitudinal axis, said side plate is a rigid planar member or sheet of material with a plane, a front edge, a rear edge, an inner edge, an outer edge, an upper surface, a lower surface, a length, a width, a thickness, a longitudinal axis, and a latitudinal axis, said front plate is a rigid planar vertical member or sheet of material with a plane, an upper edge, a lower edge, an inner edge, an outer edge, a front surface, a rear surface, a length, a width, a thickness, a longitudinal axis, and a latitudinal axis, said bottom plate is a rigid planar horizontal member or sheet of material with a plane, a front edge, a rear edge, an inner edge, an outer edge, an upper surface, a lower surface, a length, a width, a length, a thickness, a longitudinal axis, and a latitudinal axis, said top plate, said side plate, said front plate, and said bottom plate are connected together or formed together to yield said base plate assembly, wherein, said longitudinal axis of said top plate, said longitudinal axis of said side plate, and said longitudinal axis of said bottom plate are parallel, said longitudinal axis of said front plate is perpendicular to said longitudinal axis of said top plate, said longitudinal axis of said side plate, and said longitudinal axis of said bottom plate, said plane of said top plate is parallel with said plane of said bottom plate, said plane of said front plate is perpendicular to said plane of said top plate, said outer edge of said top plate is joined with or rigidly attached to said inner edge of said side plate, said front edge of said top plate is joined with or rigidly attached to said upper edge of said front plate, said outer edge of said side plate is joined with or rigidly attached to said inner edge of said bottom plate, said front edge of said side plate is joined with or rigidly attached to said outer edge of said front plate, said plane of said top plate meets said plane of said side plate at an angle that is greater than 180 degrees and less than 270 degrees, said front edge of said top plate is aligned with and even with said front edge of said side plate and said front surface of said front plate, said rear edge of said top plate is aligned with and even with said rear edge of said side plate and said top plate meets said front plate at a right angle, said top plate further comprises: a top plate forward tab, a top plate center tab, and a top plate rearward tab, wherein said top plate forward tab, said top plate center tab, and said top plate rearward tab are used to attached to a bed of a pickup truck, said tire cradle is a rigid concave upward shaped elongated horizontal member, said tire cradle is a trough, linear channel, or saddle shaped member, said tire cradle has an upper surface, a lower surface, front end, and a rear end, a length, width, height, thickness, and longitudinal axis, said tire cradle is rigidly attached to said bottom plate so that said longitudinal axis of said tire cradle is parallel with said longitudinal axis of said side plate and said longitudinal axis of said bottom plate, and said lower surface of said tire cradle is rigidly attached to said upper surface of said bottom plate.

2. A bicycle rack as recited in claim 1 further comprising a harp member, wherein, said harp member is a rigid inverted U-shaped member or rigid hoop member, said harp member 50 has: an outside diameter, a forward leg, a rearward leg, and an upper curved portion that form said inverted U-shaped member, and said forward leg and said rearward leg are rigidly attached to said upper surface of said bottom plate.

3. A bicycle rack as recited in claim 2 further comprising: a first harp hinge 51; second harp hinge 52; a first harp sleeve 53; and second harp sleeve 54, wherein, said first harp hinge is a hinge member, pivoting bearing member, or movable joint or mechanism on said forward leg of said harp member, said first harp hinge is located on said forward leg of said harp member, said first harp sleeve is a rigid cylindrical member with open ends, said first harp sleeve has an inside diameter that is sized to make a slip fit or clearance fit with said outside diameter of said harp member, said first harp sleeve reversibly covers said first harp hinge to prevent said first harp hinge from pivoting, said second harp hinge is a hinge member, pivoting bearing member, or movable joint or mechanism on said rearward leg of said harp member, said second harp hinge is located on said rearward leg of said harp member, said second harp sleeve is a rigid cylindrical member with open ends, said second harp sleeve has an inside diameter that is sized to make a slip fit or clearance fit with said outside diameter of said harp member, and said second harp sleeve reversibly covers said second harp hinge to prevent said second harp hinge from pivoting.

4. A bicycle rack as recited in claim 2 further comprising: a second tire cradle and a second tire cradle attachment bracket, wherein, said second tire cradle is a rigid concave upward shaped elongated horizontal member, said second tire cradle is a trough, linear channel, or saddle shaped member, said second tire cradle has an upper surface, a lower surface, front end, and a rear end, a length, width, height, thickness, and longitudinal axis, said second tire cradle attachment bracket is a rigid structural member with a first end and a second end, said first end of said second tire cradle attachment bracket is rigidly attached to said top plate, said second end of said second tire cradle attachment bracket is rigidly attached to said lower surface of said second tire cradle, and said second tire cradle is rigidly attached so that said longitudinal axis of said second tire cradle is parallel and co-planar with said longitudinal axis of said tire cradle, said front end of said tire cradle is even with and aligned with said front end of said second tire cradle, and said rear end of said tire cradle is even with and aligned with said rear end of said second tire cradle.

5. A bicycle rack as recited in claim 1 further comprising: a ratcheting hook member and a hook member mounting bar, wherein, said hook member mounting bar is a rigid vertical support member or column, said hook member mounting bar has an outer diameter or outer dimension, a length, a longitudinal axis, a lower end, a middle section, and an upper end, said lower end of said hook member mounting bar is rigidly attached to said upper surface of said bottom plate, said side plate, or said top plate so that said longitudinal axis of said hook member mounting bar is perpendicular to said longitudinal axis of said tire cradle, said ratcheting hook member is a rigid hook-shaped member positioned concave downwards, and said ratcheting hook member is attached to a ratcheting base that is slidably attached to said hook member mounting bar so that said ratcheting base and said ratcheting hook member may be adjusted upwards and downward along said length of said hook member mounting bar.

6. A bicycle rack as recited in claim 1 further comprising: an axle latch, wherein, said axle latch has a base with an upper surface and a lower surface, said axle latch has an axle rigidly attached to said upper surface of said base, said lower surface of said base is rigidly attached to said upper surface of said bottom plate, and said axle is reversibly attachable to a bicycle.

7. A bicycle rack comprising: a base plate assembly; an inner base rail; an outer base rail; a front stanchion assembly; a front ratcheting tire clamp; a rear stanchion assembly; and a rear ratcheting tire clamp, wherein, said base plate assembly comprises: a top plate; a side plate; a front plate; and a bottom plate, said top plate is a rigid planar L-shaped horizontal member or sheet of material with a plane, a front edge, a first rear edge, a second rear edge, an outer edge, a first inner edge, a second inner edge, an upper surface, a lower surface, a thickness, a longitudinal axis, and a latitudinal axis, said side plate is a rigid planar member or sheet of material with a plane, a front edge, a rear edge, an inner edge, an outer edge, an upper surface, a lower surface, a length, a width, a thickness, a longitudinal axis, and a latitudinal axis, said front plate is a rigid planar vertical member or sheet of material with a plane, an upper edge, a lower edge, an inner edge, an outer edge, a front surface, a rear surface, a length, a width, a thickness, a longitudinal axis, and a latitudinal axis, said bottom plate is a rigid planar horizontal member or sheet of material with a plane, a front edge, a rear edge, an inner edge, an outer edge, an upper surface, a lower surface, a length, a width, a length, a thickness, a longitudinal axis, and a latitudinal axis, said top plate, said side plate, said front plate, and said bottom plate are connected together or formed together to yield said base plate assembly, wherein, said longitudinal axis of said top plate, said longitudinal axis of said side plate, and said longitudinal axis of said bottom plate are parallel, said longitudinal axis of said front plate is perpendicular to said longitudinal axis of said top plate, said longitudinal axis of said side plate, and said longitudinal axis of said bottom plate, said plane of said top plate is parallel with said plane of said bottom plate, said plane of said front plate is perpendicular to said plane of said top plate, said outer edge of said top plate is joined with or rigidly attached to said inner edge of said side plate, said front edge of said top plate is joined with or rigidly attached to said upper edge of said front plate, said outer edge of said side plate is joined with or rigidly attached to said inner edge of said bottom plate, said front edge of said side plate is joined with or rigidly attached to said outer edge of said front plate, said plane of said top plate meets said plane of said side plate at an angle that is greater than 180 degrees and less than 270 degrees, said front edge of said top plate is aligned with and even with said front edge of said side plate and said front surface of said front plate, said rear edge of said top plate is aligned with and even with said rear edge of said side plate and said top plate meets said top plate meets said front plate 22 at a right angle, said top plate further comprises: a top plate forward tab, a top plate center tab, and a top plate rearward tab, wherein said top plate forward tab, said top plate center tab, and said top plate rearward tab are used to attached to a bed of a pickup truck, said inner base rail is a rigid horizontal structural member, said inner base rail has a length, a width, a height, an upper surface, a lower surface, an inner surface, an outer surface, a front end, a rear end, and a longitudinal axis, said outer base rail is a rigid horizontal structural member, said outer base rail has a length, a width, a height, an upper surface, a lower surface, an inner surface, an outer surface, a front end, a rear end, and a longitudinal axis, said lower surface of said inner base rail is rigidly attached to said upper surface of said top plate so said longitudinal axis of said inner base rail is parallel with said longitudinal axis of said top plate, said lower surface of said outer base rail is rigidly attached to said upper surface of said top plate so that said longitudinal axis of said outer base rail is parallel with said longitudinal axis of said top plate and said longitudinal axis of said inner base rail, said front end of said inner base rail is aligned with and even with said front end of said outer base rail, said rear end of said inner base rail is aligned with and even with said rear end of said outer base rail, said front stanchion assembly comprises: an inner stanchion and an outer stanchion, said inner stanchion on said front stanchion assembly is a rigid upright structural member with a length, a width, a height, an upper end, a lower end, an inner surface, an outer surface, a front surface, a rear surface, and a longitudinal axis, said outer stanchion on said front stanchion assembly is a rigid upright structural member with a length, a width, a height, an upper end, a lower end, an inner surface, an outer surface, a front surface, a rear surface, and a longitudinal axis, said outer surface of said lower end of said inner stanchion on said front stanchion assembly is pivotally attached to said inner surface of said front end of said inner base rail, said inner surface of said lower end of said outer stanchion on said front stanchion assembly is pivotally attached to said outer surface of said front end of said outer base rail, said outer surface of said upper end of said inner stanchion on said front stanchion assembly is rigidly attached to said inner surface of said upper end of said outer stanchion on said front stanchion assembly so that said upper end of inner stanchion on said front stanchion assembly is even with and aligned with said upper end of said outer stanchion on said front stanchion assembly and said longitudinal axis of said inner stanchion and said longitudinal axis of said outer stanchion on said front stanchion assembly are parallel, wherein a structural member has a first end rigidly attached to said outer surface of said upper end of said inner stanchion on said front stanchion assembly and a second end rigidly attached to said inner surface of said upper end of said outer stanchion on said front stanchion assembly, said front ratcheting tire clamp is a rigid horizontal structural member that is slidably attached to said inner and said outer stanchions on said front stanchion assembly, said slidable attachment is such that said front ratcheting tire clamp remains perpendicular to said inner and said outer stanchions on said front stanchion assembly, said slidable attachment is biased or ratcheted in that said front ratcheting tire clamp freely slides downwards but is restricted from upward movement without first releasing a ratchet catch, said rear stanchion assembly comprises: an inner stanchion and an outer stanchion, said inner stanchion on said rear stanchion assembly is a rigid upright structural member with a length, a width, a height, an upper end, a lower end, an inner surface, an outer surface, a front surface, a rear surface, and a longitudinal axis, said outer stanchion on said rear stanchion assembly is a rigid upright structural member with a length, a width, a height, an upper end, a lower end, an inner surface, an outer surface, a front surface, a rear surface, and a longitudinal axis, said outer surface of said lower end of said inner stanchion on said rear stanchion assembly is pivotally attached to said inner surface of said front end of said inner base rail, said inner surface of said lower end of said outer stanchion on said rear stanchion assembly is pivotally attached to said outer surface of said front end of said outer base rail, said outer surface of said upper end of said inner stanchion on said rear stanchion assembly is rigidly attached to said inner surface of said upper end of said outer stanchion on said rear stanchion assembly so that said upper end of inner stanchion on said rear stanchion assembly is even with and aligned with said upper end of said outer stanchion on said rear stanchion assembly and said longitudinal axis of said inner stanchion and said longitudinal axis of said outer stanchion on said rear stanchion assembly are parallel, wherein a structural member with a first end rigidly attached to said outer surface of said upper end of said inner stanchion on said rear stanchion assembly and a second end rigidly attached to said inner surface of said upper end of said outer stanchion on said rear stanchion assembly, said rear ratcheting tire clamp is a rigid horizontal structural member that is slidably attached to said inner and said outer stanchions on said rear stanchion assembly, said slidable attachment is such that said rear ratcheting tire clamp remains perpendicular to said inner and said outer stanchions on said rear stanchion assembly, and said slidable attachment is biased or ratcheted in that said rear ratcheting tire clamp freely slides downwards but is restricted from upward movement without first releasing a ratchet catch.

\* \* \* \* \*